(12) United States Patent
Zhang et al.

(10) Patent No.: US 11,790,563 B2
(45) Date of Patent: Oct. 17, 2023

(54) POINT CLOUD MODEL RECONSTRUCTION METHOD, ENCODER, AND DECODER

(71) Applicant: GUANGDONG OPPO MOBILE TELECOMMUNICATIONS CORP., LTD., Guangdong (CN)

(72) Inventors: Wei Zhang, Guangdong (CN); Fuzheng Yang, Guangdong (CN); Shuai Wan, Guangdong (CN); Yanzhuo Ma, Guangdong (CN); Junyan Huo, Guangdong (CN); Zexing Sun, Guangdong (CN); Sujun Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 56 days.

(21) Appl. No.: 17/563,391

(22) Filed: Dec. 28, 2021

(65) Prior Publication Data
US 2022/0122296 A1 Apr. 21, 2022

Related U.S. Application Data

(63) Continuation of application No. PCT/CN2019/094288, filed on Jul. 1, 2019.

(51) Int. Cl.
*G06T 15/00* (2011.01)
*G06T 9/00* (2006.01)
(Continued)

(52) U.S. Cl.
CPC ............ *G06T 9/001* (2013.01); *G06T 7/11* (2017.01); *G06T 9/40* (2013.01); *G06T 17/00* (2013.01); *G06T 2207/10028* (2013.01)

(58) Field of Classification Search
CPC ......... G06T 9/001; G06T 17/205; G06T 3/40; G06T 2207/20021
(Continued)

(56) References Cited

U.S. PATENT DOCUMENTS 11,252,439 B2 * 2/2022 Zhang .................. H04N 19/70
11,527,018 B2 * 12/2022 Mammou ............ H04N 19/597
(Continued)

FOREIGN PATENT DOCUMENTS

CN 107464223 12/2017
CN 108171720 6/2018
(Continued)

OTHER PUBLICATIONS

Graziosi D, Nakagami O, Kuma S, Zaghetto A, Suzuki T, Tabatabai A. An overview of ongoing point cloud compression standardization activities: Video-based (V-PCC) and geometry-based (G-PCC). APSIPA Transactions on Signal and Information Processing. 2020;9:e13.*

(Continued)

*Primary Examiner* — Phu K Nguyen
(74) *Attorney, Agent, or Firm* — Hodgson Russ LLP

(57) ABSTRACT

A point cloud model reconstruction method, an encoder, and a decoder are provided. The method includes the following. An i-th segmentation position of an i-th three-dimensional slice on a longest edge in a point cloud space is obtained, where $1 \leq i \leq n-1$ and n is a total number of three-dimensional slices to-be-processed. An i-th cube block set nearest to the i-th segmentation position in the i-th three-dimensional slice is determined based on the i-th segmentation position and a preset cube block length. An i-th vertex position with a cube block in the i-th cube block set is determined along the longest edge, where the i-th vertex position represents a position of a vertex on an edge which is away from a start (Continued)

position of the cube block by the preset cube block length. A point cloud model is reconstructed based on the i-th vertex position.

20 Claims, 18 Drawing Sheets

(51) Int. Cl.
  *G06T 7/11* (2017.01)
  *G06T 9/40* (2006.01)
  *G06T 17/00* (2006.01)
(58) Field of Classification Search
  USPC .......................................................... 345/418
  See application file for complete search history.

(56) References Cited

U.S. PATENT DOCUMENTS

| | | | | |
|---|---|---|---|---|
| 11,533,494 B2 * | 12/2022 | Mammou | ............... | H04N 19/20 |
| 11,552,651 B2 * | 1/2023 | Mammou | ............ | H04N 19/436 |
| 11,562,507 B2 * | 1/2023 | Kim | ......................... | G06T 5/002 |
| 11,580,671 B2 * | 2/2023 | Zhang | ...................... | G06T 9/001 |
| 11,582,484 B2 * | 2/2023 | Vosoughi | ........... | H04N 19/1883 |
| 11,600,038 B2 * | 3/2023 | Zhang | ........................ | G06T 9/00 |
| 11,601,488 B2 * | 3/2023 | Hur | .......................... | G06T 9/001 |
| 11,615,556 B2 * | 3/2023 | Zhang | ..................... | G06T 9/005 |
| | | | | 382/232 |
| 11,615,557 B2 * | 3/2023 | Flynn | .................... | H04N 19/132 |
| | | | | 345/419 |
| 11,620,768 B2 * | 4/2023 | Flynn | ...................... | G06T 9/001 |
| | | | | 345/419 |
| 11,631,158 B2 * | 4/2023 | Lee | .......................... | G06T 9/001 |
| | | | | 382/100 |

FOREIGN PATENT DOCUMENTS

| | | | | | |
|---|---|---|---|---|---|
| CN | | 108491596 | | 9/2018 | |
| CN | | 108632621 | | 10/2018 | |
| CN | | 109840938 | | 6/2019 | |
| CN | | 114270832 A | * | 4/2022 | ............ G06T 19/20 |
| EP | | 2709070 | | 3/2014 | |
| WO | WO 2021000240 | | * | 1/2021 | ............ G06T 17/00 |

OTHER PUBLICATIONS

Schwarz S, Preda M, Baroncini V, Budagavi M, Cesar P, Chou PA, Cohen RA, Krivokuća M, Lasserre S, Li Z, Llach J. Emerging MPEG standards for point cloud compression. IEEE Journal on Emerging and Selected Topics in Circuits and Systems. Dec. 9, 2018;9(1):133-48.*
C. Wang, W. Zhu, Y. Xu, Y. Xu and L. Yang, "Point-Voting based Point Cloud Geometry Compression," 2021 IEEE 23rd International Workshop on Multimedia Signal Processing (MMSP), Tampere, Finland, 2021, pp. 1-5, doi: 10.1109/MMSP53017.2021.9733633.*
Shao Y, Zhang Q, Li G, Li Z, Li L. Hybrid point cloud attribute compression using slice-based layered structure and block-based intra prediction. InProceedings of the 26th ACM international conference on Multimedia Oct. 15, 2018 (pp. 1199-1207).*
Mammou et al, G-PCC codec Description v2, International organization for Standardization, Jan. 2019,pp. 1-39.*
EPO, Extended European Search Report for EP Application No. 19936250.0, dated Oct. 13, 2022.
Shao et al., "G-PCC TMC13 CE13.2 report on point cloud tile and slice based coding", ISO/IEC JTC1/SC29/WG11 MPEG2018/m45867, Jan. 2019.
Chou et al., "Transform Coder for Point Cloud Attributes", ISO/IEC JTC1/SC29/WG11 MPEG2016/m38674, May 2016.
De Queiroz et al., "Compression of 3D Point Clouds Using a Region-Adaptive Hierarchical Transform", IEEE Transactions on Image Processing, Jun. 2016.
Mammou et al., "G-PCC codec description v2", ISO/IEC JTC1/SC29/WG11 N18189, Jan. 2019.
WIPO, International Search Report for International Application No. PCT/CN2019/094288, dated Apr. 10, 2020.

* cited by examiner

POINT CLOUD MODEL RECONSTRUCTION METHOD, ENCODER, AND DECODER

CROSS-REFERENCE TO RELATED APPLICATION (S)

This application is a continuation of International Application No. PCT/CN2019/094288, filed on Jul. 1, 2019, the disclosure of which is hereby incorporated by reference in its entirety.

TECHNICAL FIELD

This disclosure relates to coding technologies in the communication field, and more particularly to a point cloud model reconstruction method, an encoder, and a decoder.

BACKGROUND

In an encoder framework of geometry-based point cloud compression (G-PCC), after the input point cloud is partitioned into slices, each slice will be independently encoded. In each slice, geometry information of the point cloud and attribute information corresponding to each point cloud are encoded separately.

Currently, there are two main encoding methods for the geometry information: octree-based geometry information encoding and trisoup-based geometry information encoding. In a framework of the trisoup-based geometry information encoding, when slice partitioning along a longest edge is used, trisoup fitting is performed in each block. If a position of the slice partitioning is in the middle of a block, vertex coordinates on edges of the block will belong to two neighbouring slices. Since different slices are processed in parallel and are independent of one another, when trisoup fitting is performed, a trisoup structure in a block at adjacency of slices is broken. The sampling needs to be performed on the trisoup, so no sampling point can be obtained on discontinuous part of an inner surface of the block. As a result, an interstice(s) will appear after point cloud model reconstruction, which seriously affects quality of the point cloud model reconstruction. The reconstruction of the geometry information will be performed during encoding and decoding. Therefore, the point cloud model reconstructed by encoding or decoding will have large interstice, thereby affecting quality of encoding.

SUMMARY

In a first aspect, implementations of this application provide a point cloud model reconstruction method. The method is implemented in an encoder and includes the following.

An i-th segmentation position of an i-th three-dimensional slice on a longest edge in a point cloud space is obtained, where 1≤i≤n−1 and n is a total number of three-dimensional slices to-be-processed. An i-th cube block set nearest to the i-th segmentation position in the i-th three-dimensional slice is determined based on the i-th segmentation position and a preset cube block length. An i-th vertex position with a cube block in the i-th cube block set is determined along the longest edge, where the i-th vertex position represents a position of a vertex on an edge which is away from a start position of the cube block by the preset cube block length. A point cloud model is reconstructed based on the i-th vertex position.

In a second aspect, implementations of this application provide a point cloud model reconstruction method. The method is implemented in a decoder and includes the following.

A vertex position of each of n slices and point cloud information corresponding to the n slices are obtained by parsing a bitstream. A point cloud model is reconstructed based on the vertex position of each of the n slices and the point cloud information corresponding to the n slices.

In a third aspect, implementations of this application provide an encoder. The encoder includes: a first memory configured to store executable instructions for point cloud model reconstruction; and a first processor configured to implement the method of the first aspect when executing the executable instructions for point cloud model reconstruction stored in the first memory.

In a fourth aspect, implementations of this application provide a decoder. The decoder includes: a second memory configured to store executable instructions for point cloud model reconstruction; and a second processor configured to implement the method of the second aspect when executing the executable instructions for point cloud model reconstruction stored in the second memory.

DETAILED DESCRIPTION

For a more detailed understanding of features and technical contents of implementations of this application, realization of the implementations of this application will be described in detail below with reference to the accompanying drawings. The attached accompanying drawings are merely for reference and description, but are not used to limit the implementations of this application.

In the implementations of this application, in an encoder framework of geometry-based point cloud compression (G-PCC) of point cloud, after point cloud of an input three-dimensional image model is partitioned into slices, each slice is encoded independently.

Figure 1:
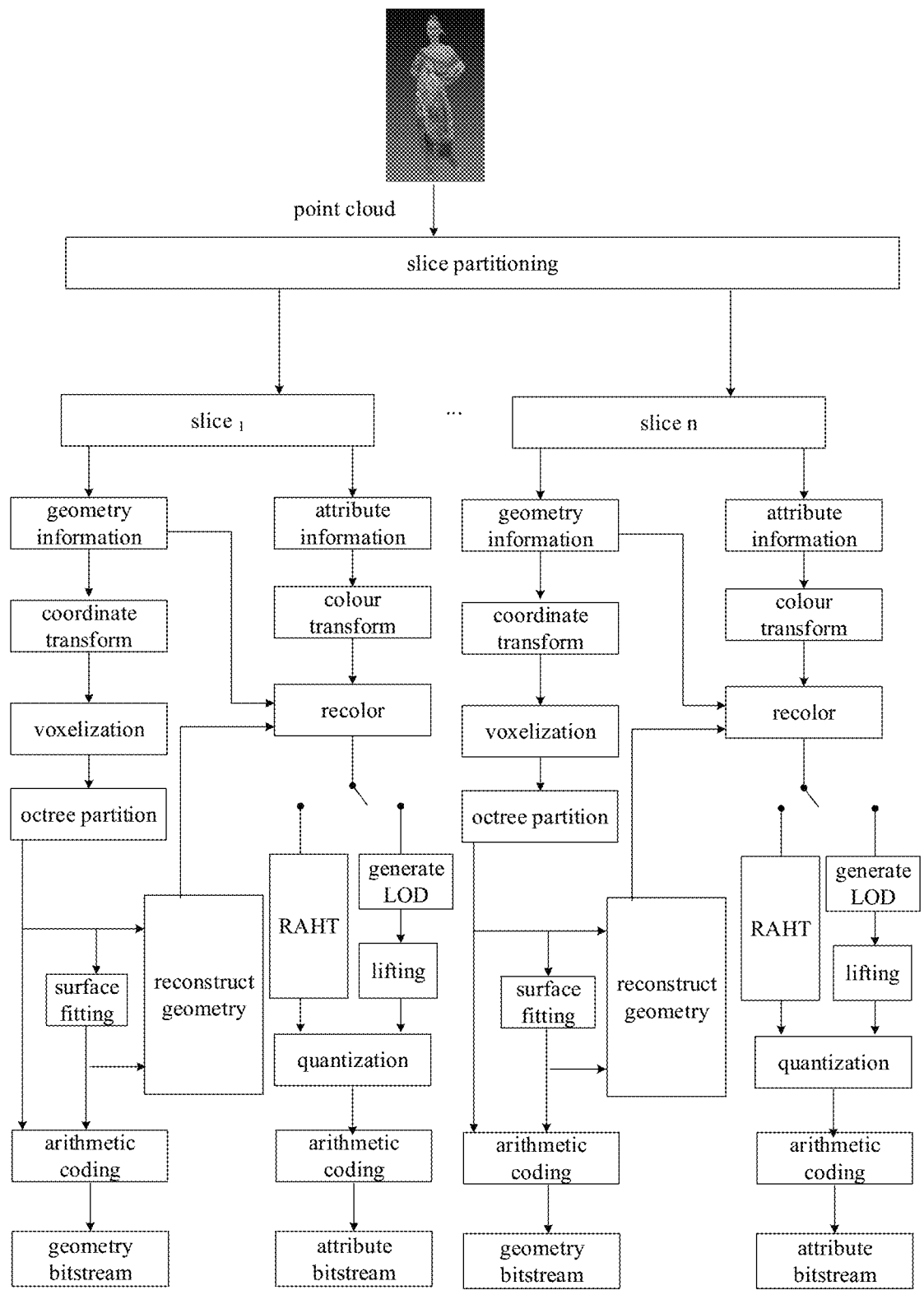
FIG. 1 is an exemplary block diagram of encoding process provided in implementations of this application.

As illustrated in the block diagram of a process of G-PCC encoding of FIG. 1, it is applied to a point cloud encoder. For point cloud data to-be-encoded, through slice partitioning, the point cloud data is first partitioned into multiple slices. In each slice, geometry information of the point cloud and attribute information corresponding to each point cloud are encoded separately. During encoding of the geometry information, perform coordinate transform on the geometry information to so that all of the point cloud is contained in a bounding box, and then quantify, which mainly plays a role of scaling. Due to the rounding of quantifying, the geometry information of part of the point cloud is the same, so decide whether to remove duplicate points based on parameters. The process of quantifying and removing the duplicate points is also called the voxelization. Thereafter, perform octree partitioning on the bounding box. During encoding of the geometry information based on octree, the bounding box is equally partitioned into eight sub-cubes, and non-empty (including points in the point cloud) sub-cubes are continued to be partitioned into eight equal parts until leaf nodes obtained through partitioning are 1×1×1 unit cubes. Perform arithmetic coding on nodes in the leaf nodes to generate a binary geometry bitstream, that is, geometry code stream. During encoding of the geometry information based on triangle soup (trisoup), octree partitioning is also performed first. Different from the encoding of the geometry information based on octree, the trisoup does not need to partition the point cloud step by step into unit cubes each with an edge length (also known as side length) of 1×1×1, but partitions the point cloud into blocks each with an edge length of W and then stops the partitioning. Based on a surface formed by distribution of the point cloud in each block, at most twelve vertexes generated by both the surface and twelve edges of the block are obtained. Perform arithmetic coding on the vertexes (surface fitting based on vertexes), to generate a binary geometry bitstream, that is, geometry code stream. The vertexes are also used in implementation of geometry reconstruction and reconstructed geometry information is used when the attribute information of the point cloud is encoded.

During encoding of the attribute information, after the encoding of the geometry information is completed and the geometry information is reconstructed, colour transform is performed, that is, colour information (i.e., the attribute information) is transformed from a RGB colour space to a YUV colour space. Thereafter, use the reconstructed geometry information to recolor the point cloud, so that attribute information that has not been encoded can correspond to the reconstructed geometry information. During the encoding of the colour information, there are mainly two transform methods. One is distance-based lifting transform which relies on level of detail (LOD) partitioning. The other is regional adaptive hierarchical transform (RAHT) which is performed directly. Both methods transform the colour information from a spatial domain to a frequency domain, obtain high-frequency coefficients and low-frequency coefficients through transform, and finally quantize the coefficients (i.e., quantized coefficients). At last, after octree partitioning and surface fitting, geometry encoding data and quantized coefficient processing attribute encoding data are slice-synthesized, and the vertex coordinate of each block are encoded in turn (that is, arithmetic coding), to generate a binary attribute bitstream, that is, attribute code stream.

Figure 2:
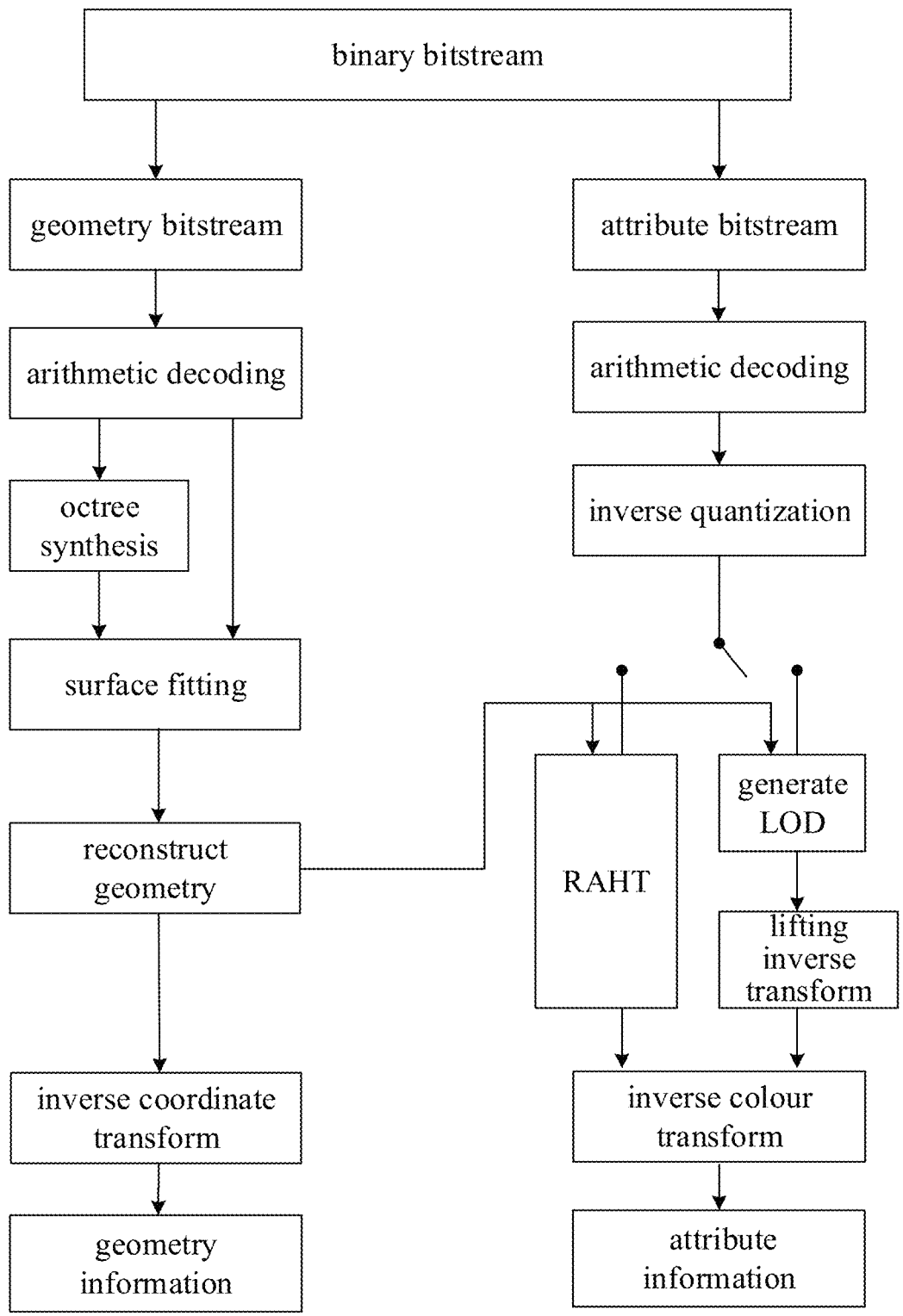
FIG. 2 is an exemplary block diagram of decoding process provided in implementations of this application.

As illustrated in the block diagram of a process of G-PCC decoding of FIG. 2, it is applied to a point cloud decoder. The decoder obtains a binary bitstream and independently decodes the geometry bitstream and the attribute bitstream in the binary bitstream. When decoding the geometry bitstream, the geometry information of the point cloud is obtained through arithmetic decoding-octree synthesis-surface fitting-reconstructing geometry-inverse coordinate transform. When decoding the attribute bitstream, the attribute information of the point cloud is obtained through arithmetic decoding-inverse quantization-LOD-based inverse lifting or RAHT-based inverse transform-inverse colour transform. The three-dimensional image model of the point cloud data to-be-encoded is restored based on the geometry information and the attribute information.

The slice partitioning processing based on trisoup is a slice partitioning scheme for uniform-geometry partition along the longest edge. This scheme has been accepted by the standard MPEG-I (ISO/IEC 23090) Part 9, and corresponding codes have been integrated in the G-PCC point cloud encoder. The specific implementation of the solution is described as follows.

When the configuration parameter partitionMethod=2, for the point cloud, slice partitioning is performed along the longest edge. First, for the input point cloud data, first respectively find the maximum and minimum values of each component in three dimensions x, y, z, that is, $\{x_{max}, x_{min}\}$, $\{y_{max}, y_{min}\}$, and $\{z_{max}, z_{min}\}$, and determine the edge length of the longest edge maxEdgeAxis maxEdge=max$\{$max$\{x_{max}, y_{max}\}, z_{max}\}$ and the edge length of the shortest edge minEdgeAxis minEdge=min$\{$min$\{x_{min}, y_{min}\}, z_{min}\}$. Then, along the origin of the coordinate axis where the longest edge is located, perform slice partitioning with the edge length of the shortest edge minEdge as the interval. The number of partitions is: sliceNum=⌈maxEgde/minEdge⌉, where ⌈ ⌉ represents ceil. Among the slices obtained by partitioning based on this method, the first sliceNum−1 slices have the same length on the longest edge, where the length is sliceSize=minEdge, and the length of the last slice on the longest edge is last_sliceSize=maxEdge−(sliceNum−1)*minEdge.

Figure 3:
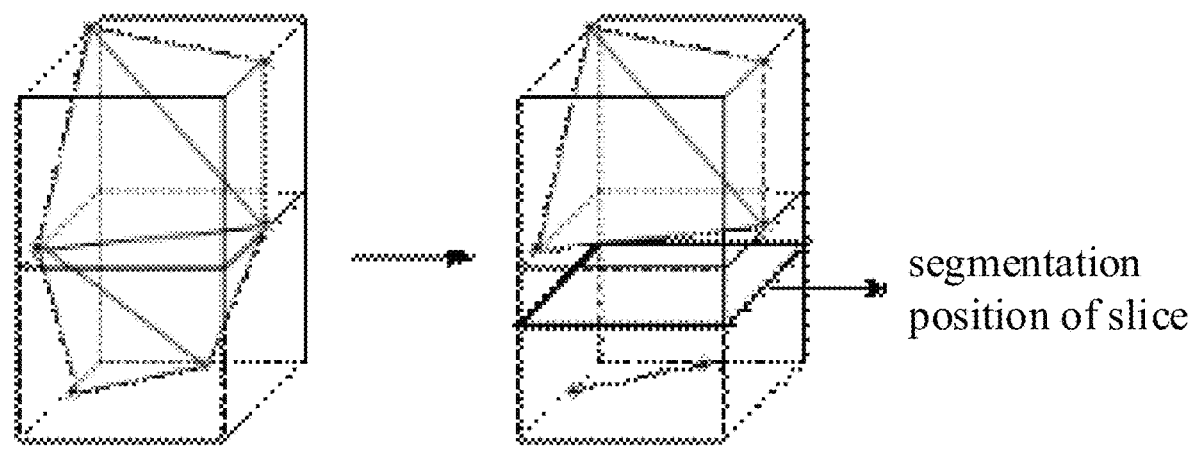
FIG. 3 is an exemplary schematic diagram of a segmentation position of a slice provided in implementations of this application.
Figure 4:
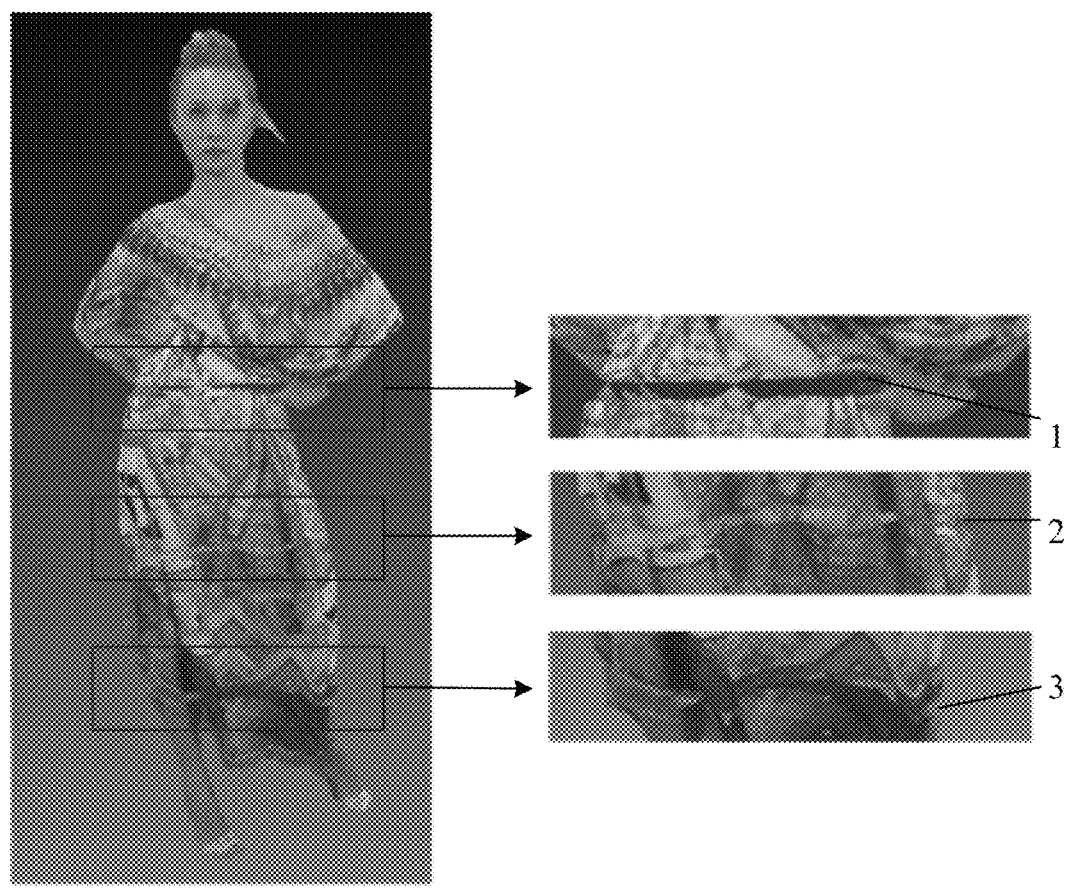
FIG. 4 is exemplary schematic diagram 1 of an existing point cloud model provided in implementations of this application.

During trisoup-based geometry information encoding and decoding, trisoup fitting needs to be performed in each block. If a position of slice partitioning is in the middle of a block, vertexes on edges of the block will belong to two neighbouring slices. Since different slices are processed in parallel and are independent of one another, when trisoup fitting is performed, a trisoup structure in a block at adjacency of slices is broken (the segmentation position of the slice as illustrated in FIG. 3 truncates the trisoup structure). The sampling needs to be performed on the trisoup, so no sampling point can be obtained on discontinuous part of an inner surface of the block. As a result, an interstice or crack will appear after reconstruction. That is, during trisoup-based geometry information encoding, slice partitioning is performed using uniform partitioning along the longest edge, when the three-dimensional image model of the point cloud is decoded and reconstructed, there will be interstices between neighbouring slices, which will seriously affect the quality of reconstruction (there are connection interstices 1, 2, and 3 in the decoded point cloud model as illustrated in FIG. 4).

In some implementations of this application, the point cloud geometry information encoding based on trisoup is described as follows.

For the point cloud geometry information encoding based on trisoup, the octree partitioning is performed first. According to the set parameter trisoup_node_size_log 2, the octree partitioning stops when blocks are obtained, where the edge length of each block is W=$2^{trisoup\_node\_size\_log\ 2}$. Based on a surface formed by distribution of the point cloud in each block, at most twelve vertexes generated by both the surface and twelve edges of the block are obtained, and the vertex coordinate of each block are sequentially encoded to generate a binary bitstream. For point cloud geometry information reconstruction based on trisoup, when the point cloud decoder performs point cloud geometry information reconstruction, the vertex coordinate is first decoded, to complete trisoup reconstruction.

Figure 5:
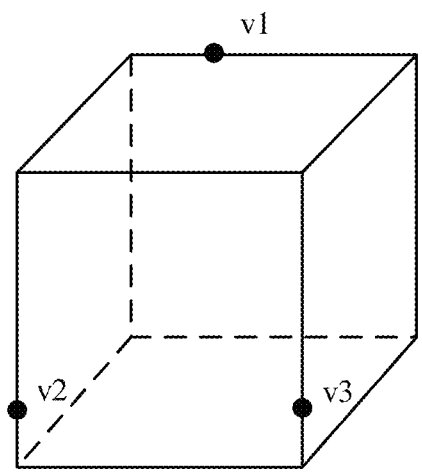
FIG. 5 is exemplary schematic diagram 1 of vertex fitting process in a block provided in implementations of this application.
Figure 6:
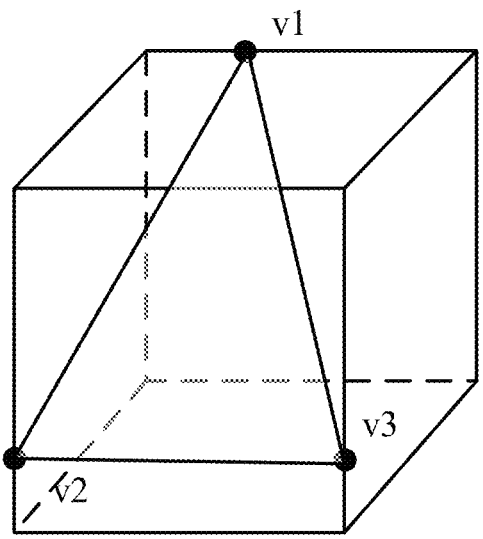
FIG. 6 is exemplary schematic diagram 2 of vertex fitting process in a block provided in implementations of this application.
Figure 7:
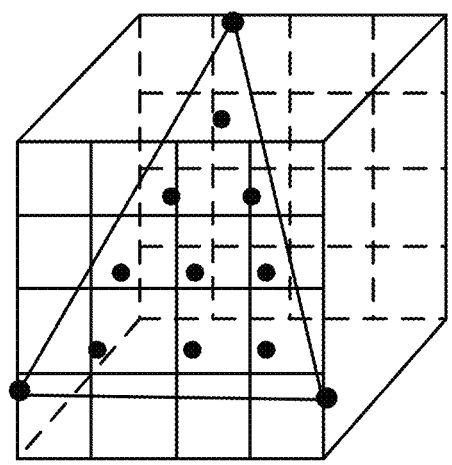
FIG. 7 is exemplary schematic diagram 3 of vertex fitting process in a block provided in implementations of this application.

Exemplarily, there are three vertexes (v1, v2, v3) in the block illustrated in FIG. 5. The structure formed in a certain order by using these three vertexes is called triangle soup, i.e., trisoup, as illustrated in FIG. 6. Then, perform sampling on the trisoup and determine the obtained sampling points as the reconstructed point cloud in the block, as illustrated in FIG. 7.

Based on the above background introduction, a point cloud model reconstruction method provided in implementations of this application is introduced below.

At S00, n−1 three-dimensional slices are reconstructed, and based on vertex position information (also known as a vertex position) at intersection of a currently-encoded three-dimensional slice and an already-encoded neighbouring three-dimensional slice, a trisoup of the currently-encoded three-dimensional slice is constructed, to achieve reconstruction of a point cloud model, where n is a total number during three-dimensional slice partitioning and n is a positive integer greater than or equal to 2.

In the implementations of this application, during encoding of a three-dimensional image model, the point cloud data of the three-dimensional image model to-be-encoded in space is obtained, and the point cloud data can include the geometry information and the attribute information of the three-dimensional image model. During encoding the three-dimensional image model, the geometry information of the point cloud and the attribute information corresponding to each point are separately encoded. During the trisoup-based geometry information encoding, first obtain the point cloud data of the three-dimensional image model (that is, the point cloud model), perform slice partitioning on the point cloud data to obtain n three-dimensional slices, and then encode each slice. The point cloud model reconstruction method provided in the implementations of this application is mainly applied to the process of point cloud model reconstruction (that is, reconstructing geometry) during geometry encoding of encoding the n slices, and to the process of reconstructing geometry after surface fitting during decoding.

It should be noted that, the point cloud reconstruction method provided in the implementations of this application are applied in a scene where the point cloud geometry information reconstruction based on trisoup is performed on the premise that the method of slice partitioning along the longest edge in the trisoup-based geometry information encoding is achieved.

In the implementations of this application, during the slice partitioning along the longest edge, since the partitioning interval of the slice is not an integer multiple of the cube block, a part of the vertex position information of the block where the segmentation position of the slice is located is missing, and thus interstices appear after reconstruction. Therefore, the implementations of this application mainly aim at a case where the coordinate component along the longest edge of the segmentation position of the slice is not an integer multiple of the edge length of the block.

When the encoder performs three-dimensional slice partitioning on the space where the point cloud data is located, n slices are obtained. When reconstructing the n−1 three-dimensional slices, the vertex position information at the intersection of the currently-encoded three-dimensional slice and the already-encoded neighbouring three-dimensional slice is obtained and the trisoup of the currently-encoded three-dimensional slice is constructed based on the vertex position information at the intersection of the currently-encoded three-dimensional slice and the already-encoded neighbouring three-dimensional slice, to achieve reconstruction of the point cloud model, where n is the total number during three-dimensional slice partitioning and n is a positive integer greater than or equal to 2.

It can be understood that, the encoder also can, during reconstructing geometry, for each three-dimensional slice, that is, during encoding of the currently-encoded three-dimensional slice, construct the trisoup of the currently-encoded three-dimensional slice based on the vertex position information at the intersection with the already-encoded neighbouring three-dimensional slice. As such, during the point cloud model reconstruction, the encoder also can use the vertex position information at the intersection with the already-encoded neighbouring three-dimensional slice to participate in fitting of the trisoup. Thus, the vertex position information that may be truncated in neighbouring slices is considered during reconstructing geometry, and the interstice after the point cloud model reconstruction is eliminated. The accuracy of the point cloud model reconstruction during encoding and decoding can be further improved, and finally the quality of encoding can be improved.

Figure 8:
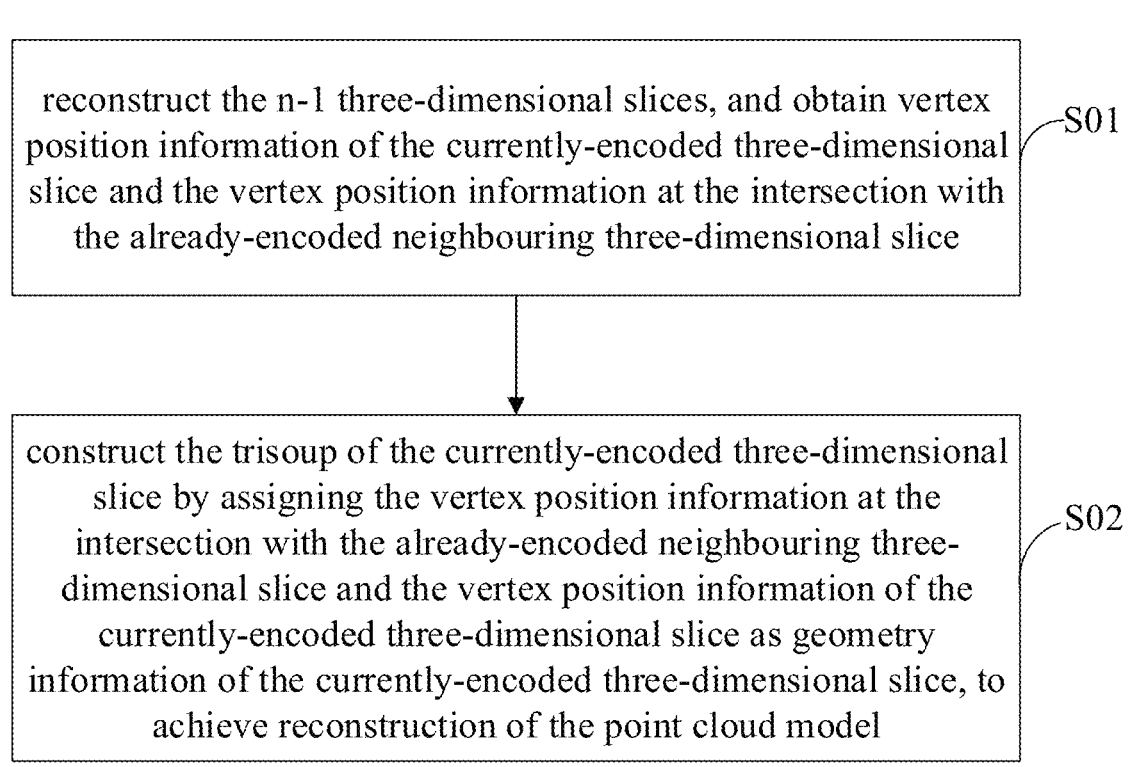
FIG. 8 is flow chart 1 of point cloud model reconstruction provided in implementations of this application.

In some implementations of this application, as illustrated in FIG. 8, The specific implementation process of the above operation includes S01-S02. Refer to the following.

At S01, the n−1 three-dimensional slices are reconstructed, and vertex position information of the currently-encoded three-dimensional slice and the vertex position information at the intersection with the already-encoded neighbouring three-dimensional slice are obtained.

At S02, the trisoup of the currently-encoded three-dimensional slice is constructed by assigning the vertex position information at the intersection with the already-encoded neighbouring three-dimensional slice and the vertex position information of the currently-encoded three-dimensional slice as geometry information of the currently-encoded three-dimensional slice, to achieve reconstruction of the point cloud model.

In the implementations of this application, when reconstructing the n−1 three-dimensional slices, the encoder can obtain from the point cloud data the vertex position information of the currently-encoded three-dimensional slice, that is, the point cloud information of the currently-encoded three-dimensional slice. In this way, based on the obtained the vertex position information at the intersection with the already-encoded neighbouring three-dimensional slice, they are together used as the geometry information during geometry reconstruction of the currently-encoded three-dimensional slice, to construct the trisoup of the currently-encoded three-dimensional slice, to achieve reconstruction of the point cloud model.

Figure 9:
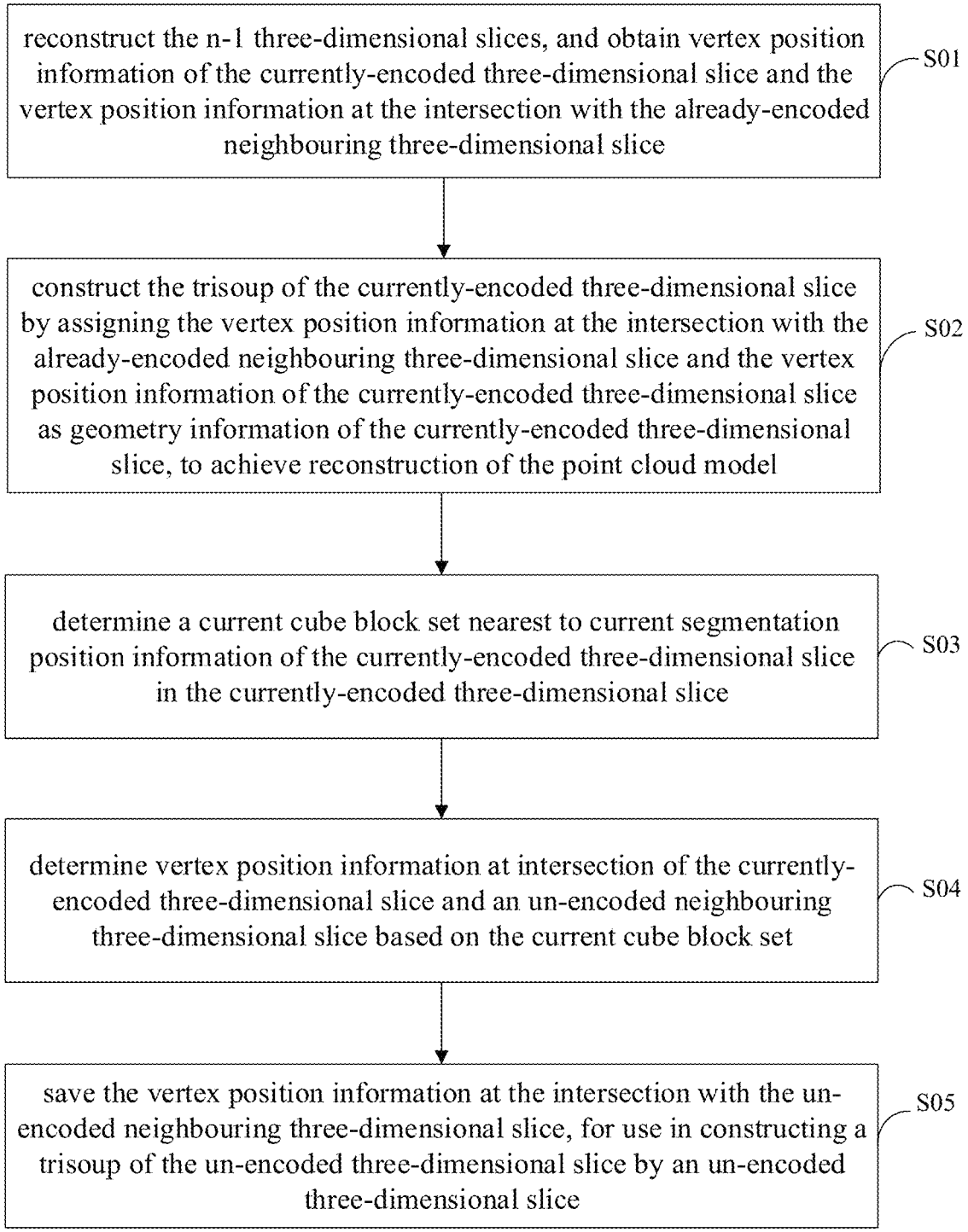
FIG. 9 is flow chart 2 of point cloud model reconstruction provided in implementations of this application.

In some implementations of this application, after S02, as illustrated in FIG. 9, the method performed by the encoder further includes S03-S05. Refer to the following.

At S03, a current cube block set nearest to current segmentation position information (also known as a current segmentation position) of the currently-encoded three-dimensional slice in the currently-encoded three-dimensional slice is determined.

At S04, vertex position information at intersection of the currently-encoded three-dimensional slice and an un-encoded neighbouring three-dimensional slice is determined based on the current cube block set.

At S05, the vertex position information at the intersection with the un-encoded neighbouring three-dimensional slice is saved, for use in constructing a trisoup of the un-encoded three-dimensional slice by an un-encoded three-dimensional slice.

In the implementations of this application, after geometry reconstruction of the currently-encoded three-dimensional slice is completed, from the currently-encoded three-dimensional slice, the current cube block set nearest to the current segmentation position information of the currently-encoded three-dimensional slice in the currently-encoded three-dimensional slice is determined. Then, on an edge which is away from a start position of a cube block in the current cube block set by a preset cube block length, the vertex position information at the intersection of the currently-encoded three-dimensional slice and the un-encoded neighbouring three-dimensional slice is determined. The encoder saves the vertex position information at the intersection with the un-encoded neighbouring three-dimensional slice, for use in constructing a trisoup of the un-encoded three-dimensional slice by an un-encoded three-dimensional slice.

Exemplarily, the encoder saves the vertex position information of the currently-encoded three-dimensional slice in a table. When the geometry information in a (p+1)-th slice (a neighbouring three-dimensional slice that is not being currently encoded) is encoded, the vertex information (vertex position information) stored in table (p) in the p-th slice (currently-encoded three-dimensional slice) is inserted into the vertex information of the (p+1)-th slice, that is, stored in table (p+1). In this way, when the (p+1)-th slice is reconstructed, the vertex information in table (p+1) can be used for geometry reconstruction.

It should be noted that, reconstruction for n−1 three-dimensional slices is performed according to the above implementation process, while reconstruction for the n-th three-dimensional slice is still based on the point cloud information of the n-th three-dimensional slice. Until the reconstruction of n three-dimensional slices is completed, the reconstruction of the point cloud data is completed.

Figure 10:
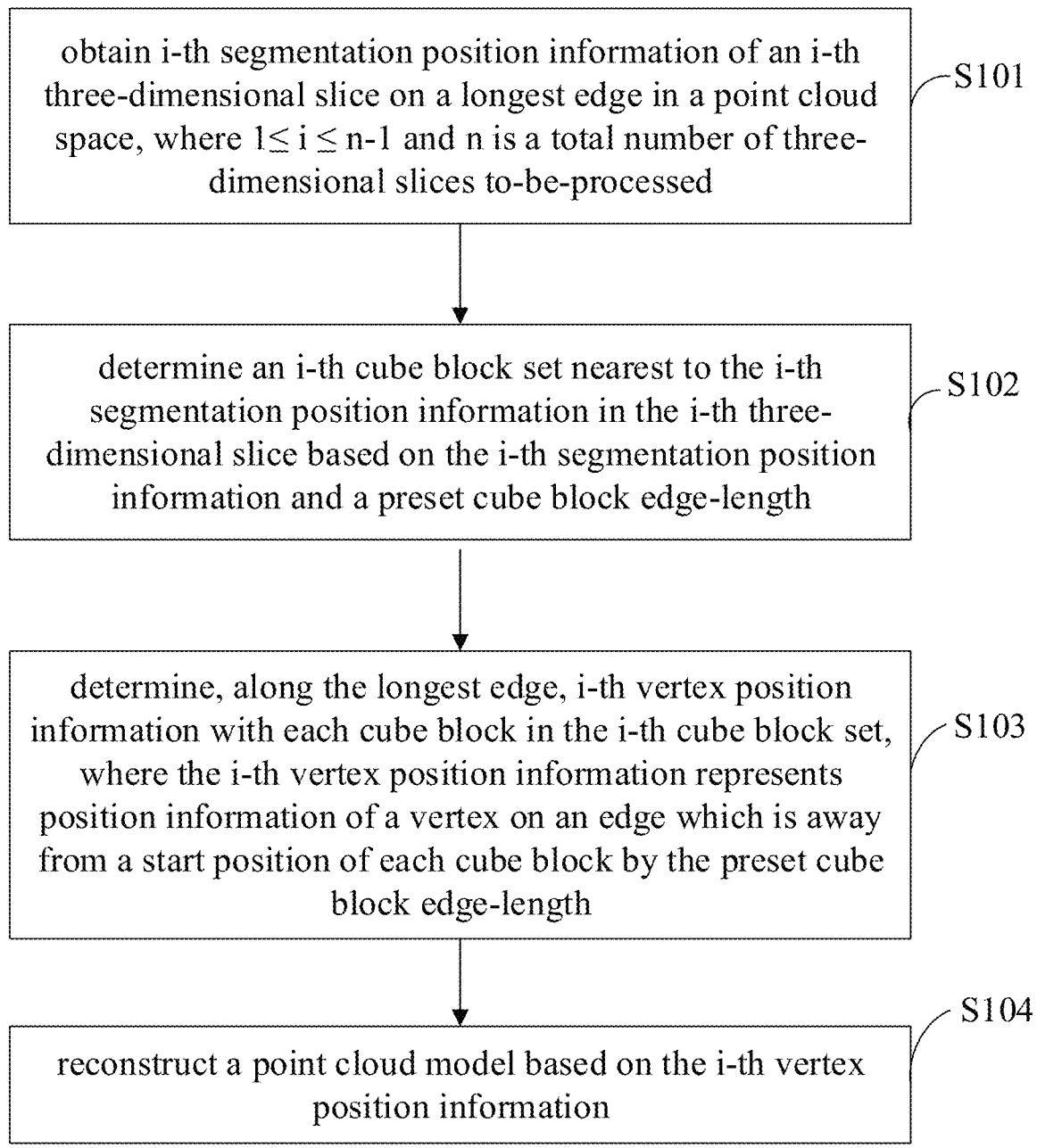
FIG. 10 is flow chart 1 of point cloud model reconstruction further provided in implementations of this application.

As illustrated in FIG. 10, a point cloud model reconstruction method is further provided in implementations of this application. The method is implemented in an encoder and includes the following.

At S101, i-th segmentation position information (also known as an i-th segmentation position) of an i-th three-dimensional slice on a longest edge in a point cloud space is obtained, where $1 \leq i \leq n-1$ and n is a total number of three-dimensional slices to-be-processed.

At S102, an i-th cube block set nearest to the i-th segmentation position information in the i-th three-dimensional slice is determined based on the i-th segmentation position information and a preset cube block length.

At S103, i-th vertex position information (also known as an i-th vertex position) with each cube block (such as a cube block) in the i-th cube block set is determined along the longest edge, where the i-th vertex position information represents position information of a vertex on an edge which is away from a start position of each cube block by the preset cube block length.

At S104, a point cloud model is reconstructed based on the i-th vertex position information.

In S101, the encoder can find the maximum and minimum values of each component in three dimensions x, y, z based on the three-dimensional coordinates corresponding to each point in point cloud data to-be-encoded and find a longest edge from the maximum and minimum values corresponding to each of the three dimensions.

Exemplarily, the encoder finds, from many component values in three dimensions X, y, z, the maximum value and minimum value of each component, that is, $\{x_{max}, x_{min}\}$, $\{y_{max}, y_{min}\}$, and $\{z_{max}, z_{min}\}$ and determine, from $x_{max}$, $y_{max}$, and $z_{max}$, the first edge length of the longest edge maxEdgeAxis with the largest value: maxEdge=max$\{$max$\{x_{max}, y_{max}\}, z_{max}\}$.

It should be noted that, in the implementation of this application, the space occupied by the point cloud data in the three-dimensional space is understood herein as the space of the point cloud data. That is, the space block herein can be understood as the point cloud space based on the maximum and minimum values of each component.

Figure 11:
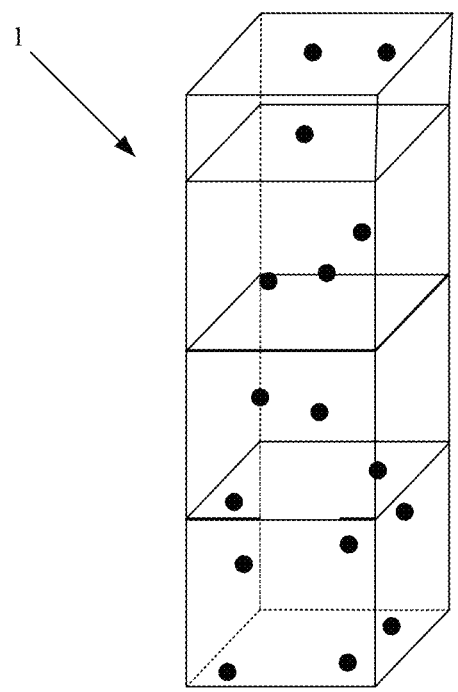
FIG. 11 is an exemplary schematic diagram of a point cloud space provided in implementations of this application.

Exemplarily, as illustrated in FIG. 11, the point cloud space is indicated by 1 in this figure.

It should be noted that, the point cloud space can be segmented multiple times along the longest edge until the point cloud space is partitioned into n three-dimensional slices. The specific number of n is determined based on the actual partitioning.

In the implementation of this application, after the slice partitioning, the encoder obtains the n three-dimensional slices, that is, n slices. Starting from the origin along the longest edge, the n slices in sequence are: the first three-dimensional slice, the second three-dimensional slice, the third three-dimensional slice, . . . , n-th three-dimensional slice. n is the total number of three-dimensional slices to-be-processed and in the implementation of this application, n may be a positive integer greater than or equal to 2.

In the implementation of this application, after the slice partitioning, the encoder can obtain the segmentation position information of the n three-dimensional slices. For the first three-dimensional slice, the encoder obtains a surface formed by distribution of the point cloud in a block contained in the first three-dimensional slice and obtains at most twelve vertexes generated by both the surface and twelve edges of the block, and sequentially encodes the vertex coordinate of each block (that is, trisoup fitting and sampling), to generate a binary bitstream.

After the slice partitioning, the encoder can obtain the segmentation positions of the partitioned n three-dimensional slices. For the i-th three-dimensional slice, the encoder also can obtain its i-th segmentation position information on the longest edge of the point cloud space.

It should be noted that, the i-th segmentation position information in the implementations of this application is the length value of the coordinate component of the longest edge from the origin to the i-th slice three-dimensional slice.

Figure 12:
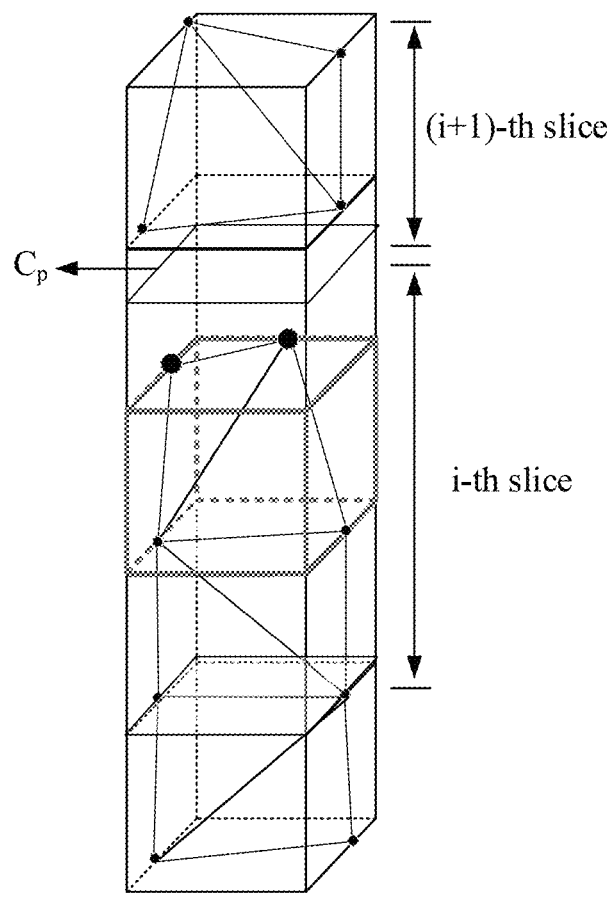
FIG. 12 is exemplary schematic diagram 1 of neighbouring slices provided in implementations of this application.

Exemplarily, as illustrated in FIG. 12, the i-th segmentation position information is the length value of $C_p$.

In S102, in the implementations of this application, during partitioning the point cloud data into slices along the longest edge, the preset configuration parameters can be obtained, that is, trisoup_node_size_log 2. When performing block partitioning, the preset cube block length (blocksize), that is, the edge length of the block, is determined based on the preset configuration parameters.

In some implementations of this application, the edge length of the block is 2 to the power of trisoup_node_size_log 2, that is, the edge length of each block is $W=2^{trisoup\_node\_size\_log\ 2}$. That is, the preset cube block length is known.

In this way, the encoder can determine the i-th cube block set nearest to the i-th segmentation position information in the i-th three-dimensional slice based on the i-th segmentation position information and the preset cube block length.

It should be noted that, in the implementations of this application, there may also be many cube blocks at the same position of the longest edge in a three-dimensional slice, which depends on lengths of other two dimensions of the non-longest edges and the multiple of the preset cube block length. Herein, each block in the i-th cube block set has the same coordinate component along the longest edge, and the only difference is coordinate components of other dimensions.

In the implementations of this application, the encoder can obtain the i-th cube block set nearest to the i-th segmentation position information in the i-th three-dimensional slice, that is, obtain multiple cube blocks, belonging to the i-th three-dimensional slice, nearest to the i-th segmentation position information.

In some implementations of this application, the encoder determines the i-th cube block set nearest to the i-th segmentation position information in the i-th three-dimensional slice based on the i-th segmentation position information and the preset cube block length as follows. An i-th offset is obtained by rounding the i-th segmentation position information with the preset cube block length as unit. A start position of an i-th cube block is determined based on the i-th segmentation position information, the i-th offset, and the preset cube block length. The i-th cube block set is determined based on the start position of the i-th cube block and the preset cube block length.

The i-th offset represents the length from the i-th segmentation position information to the start position of the cube block where it is located. Certainly, the i-th offset also can be obtained in other ways, such as taking the remainder, etc., which is not limited in the implementations of this application.

In this way, subtract the i-th offset from the i-th segmentation position information and then subtract one preset cube block length, to determine the start position of the cube block.

It should be noted that, the i-th segmentation position of the i-th three-dimensional slice must locate in the one cube block, that is, the non-vertex part of an edge of the block in the longest edge direction. Therefore, the block nearest to the i-th segmentation position information in the i-th three-dimensional slice is determined as follows. From the i-th segmentation position and along the longest edge, move down to the start position of the nearest block, and from the start position of the nearest block and along the longest edge, move one block, to determine the end position of the start position of the nearest block, thereby determining the nearest block set. The downward moving distance is obtained by rounding the i-th segmentation position with the unit of preset cube block length, that is, the i-th offset.

Figure 13:
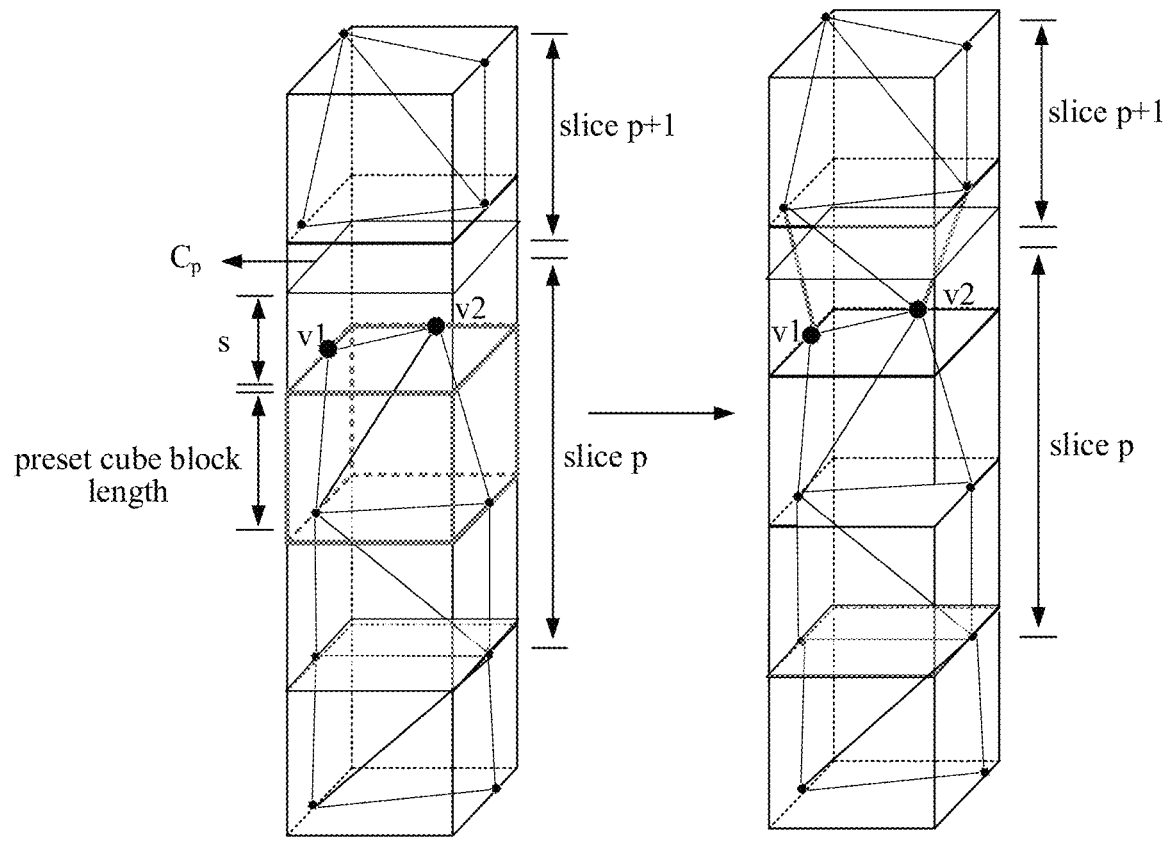
FIG. 13 is exemplary schematic diagram 2 of neighbouring slices provided in implementations of this application.

Exemplary, as illustrated in FIG. 13, assuming that the partitioning interval is minEdge, the partitioning position $C_p$ of the p-th slice ($slice_p$) on the longest edge of the point cloud is: $C_p=p*minEdge$, where the block edge length blockSize can be: $blockSize=2^{trisoup\_node\_size\_log\ 2}$. Then, based on $C_p$ and blockSize, determine the complete block contained in the p-th slice and the block set nearest to $C_p$. The block set is composed of all blocks in the p-th slice whose start position pos[maxEdge] of the coordinate component on the longest edge is pos[maxEdge]=$C_p$−s−blockSize, where s=$C_p$% blockSize, pos[maxEdge] is the start position of the p-th cube block, and s is the p-th offset.

In S103, during determining the i-th cube block set by the encoder, the start position of each cube block in the i-th cube block set is obtained, that is, the start position of the i-th cube block. Then, the encoder determines, along the longest edge, from the i-th cube block set, the i-th vertex position information on the edge which is away from the start position of each cube block by the preset cube block length.

It should be noted that, the vertex is the point that intersects the edge of the cube block in the point cloud space. The intersecting point may be a point that directly intersects the edge of the cube block, or may be a point on the edge of the cube block obtained by performing processing such as averaging on many points near the edge of the cube block.

In the implementations of this application, the point cloud reconstruction model device obtains, in the i-th cube block set, the position information of the vertex on the edge of the target block in the i-th cube block set $C_p$-s away from the i-th segmentation position information, that is, i-th vertex position information.

It should be noted that, in the implementations of this application, the i-th vertex position information includes edge length position information of the vertex on the edge of the target block (represented by a three-dimensional coordinate vector) and the coordinate of the vertex (that is, vertex coordinate). The vertex coordinate represents the offset of the vertex on the corresponding edge (indicated by the index information), which is a one-dimensional value. In geometry reconstruction, only the edge length position information and the vertex coordinate are required to determine the specific point cloud reconstruction position in the three-dimensional space coordinates.

Figure 14:
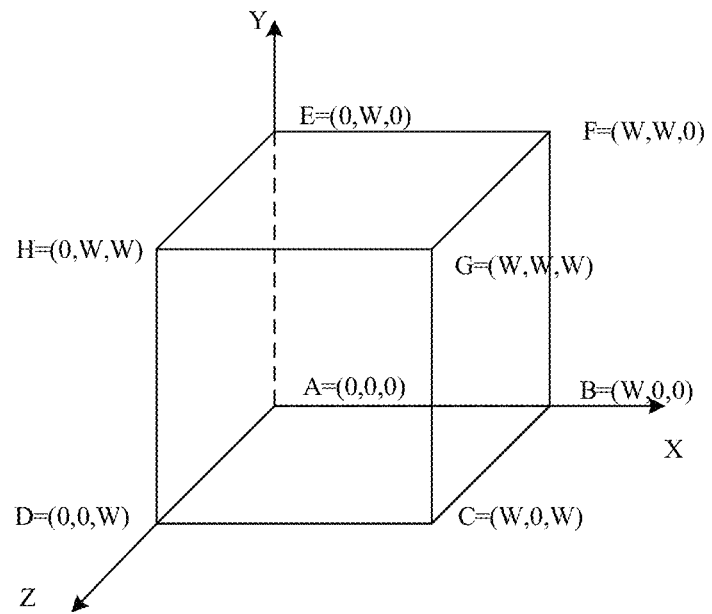
FIG. 14 is an exemplary schematic diagram of coordinates of edges of a block provided in implementations of this application.

In the implementations of this application, for example, the representation of edges of one block is determined based on the coordinates of the angular points of the cube. As illustrated in FIG. 14, the angular points of one block include: A, B, C, D, E, F, G, and H. Then, based on the coordinates of A, B, C, D, E, F, G, and H: A=(0,0,0), B=(W,0,0), C=(W,0,W), D=(0,0,W), E=(0,W,0), F=(W,W,0), G=(W,W,W) and H=(0,W,W), edges of one block can be expressed as: AB=000W00, AE=0000W0, EF=0W0WW0, BF=W00WW0, AD=00000 W, EH=0W00WW, FG=WW0WWW, BC=W00W0W, DC=00WW0W, DH=00W0WW, HG=0WWWWW, CG=W0WWWW.

Exemplarily, as illustrated in FIG. 13, the gray cube in FIG. 13 is a schematic diagram of a certain block in the block set. v1 and v2 are, in the block set, the vertexes on the edge where the coordinate component on the longest edge is away from the start position by blockSize. These two vertexes will be stored. v1 and v2 are used in trisoup fitting of reconstruction process in the (p+1)-th slice (slice$_{p+1}$), so that the surface formed by the trisoup fitting at the interstice between neighbouring slices is continuous, thereby eliminating the interstice between neighbouring slices.

In S104, the i-th vertex position information obtained by the encoder may be the vertex belonging to the i-th three-dimensional slice but not belonging to the (i+1)-th three-dimensional slice due to the segmentation position of the slice, and thus, information about the missing points of the interstice after reconstruction appears. Therefore, in the implementations of this application, the point cloud model device takes into account the i-th vertex position information. When the point cloud model is reconstructed, discontinuous sampling points on the surface during trisoup fitting caused by the loss of i-th vertex position information can be avoided. For the missing vertexes in each three-dimensional slice, if the processing of S101-S103 is performed, during the entire reconstruction of the slice, the interstice after the point cloud model reconstruction can be eliminated. In turn, the accuracy of the point cloud model reconstruction during encoding and decoding can be improved, and the quality of encoding can be finally improved.

Figure 15:
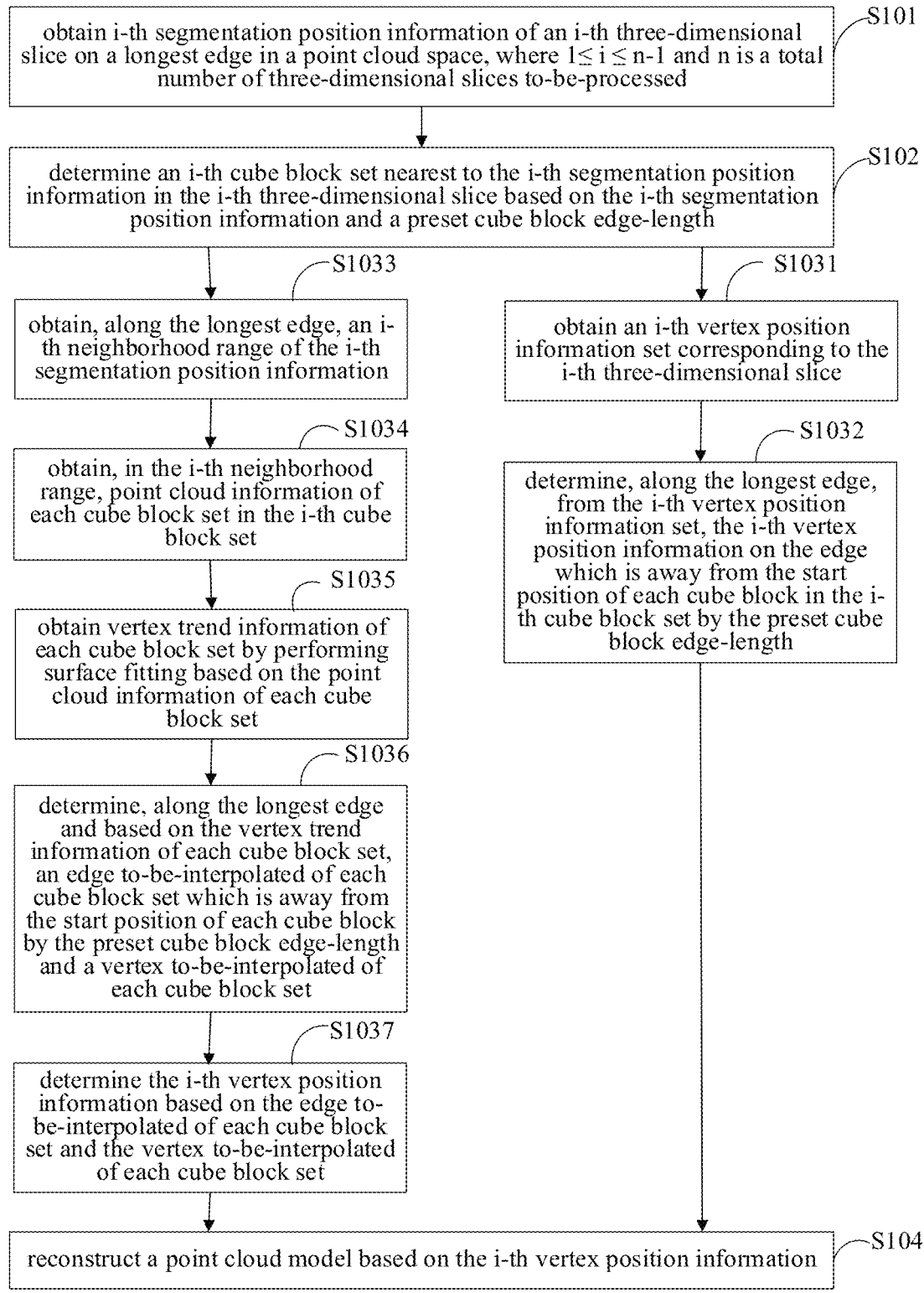
FIG. 15 is flow chart 2 of point cloud model reconstruction provided in implementations of this application.

In some implementations of this application, based on FIG. 10, as illustrated in FIG. 15, the implementation of S103 in the point cloud model reconstruction method provided in the implementations of this application can include S1031-S1037. Refer to the following.

At S1031, an i-th vertex position information set (also known as an i-th vertex position set) corresponding to the i-th three-dimensional slice is obtained.

At S1032, determine, along the longest edge, from the i-th vertex position information set, the i-th vertex position information on the edge which is away from the start position of each cube block in the i-th cube block set by the preset cube block length.

In the implementations of this application, the vertex position information in the block contained in each three-dimensional slice of the encoder is known. The i-th vertex position information set in all blocks corresponding to the i-th three-dimensional slice can be obtained. Then, from the i-th vertex position information set, the i-th vertex position information on the edge which is away from the start position of each cube block by the preset cube block length is determined, along the longest edge, in the i-th cube block set.

This is to determine, directly based on the known position information of all vertexes, the i-th vertex position information on the edge which is away from the start position of each cube block in the i-th cube block set by the preset cube block length.

At S1033, an i-th neighborhood range of the i-th segmentation position information is obtained along the longest edge.

At S1034, point cloud information of each cube block set in the i-th cube block set is obtained in the i-th neighborhood range.

At S1035, vertex trend information of each cube block set is obtained by performing surface fitting based on the point cloud information of each cube block set.

At S1036, an edge to-be-interpolated of each cube block set which is away from the start position of each cube block by the preset cube block length and a vertex to-be-interpolated of each cube block set are determined along the longest edge and based on the vertex trend information of each cube block set.

At S1037, the i-th vertex position information is determined based on the edge to-be-interpolated of each cube block set and the vertex to-be-interpolated of each cube block set.

In the implementations of this application, furthermore, interpolation on the edge of each cube block set when the coordinate component along the longest edge is away from the start position of each cube block by the preset cube block length can be directly performed by the encoder, for insertion of the vertex, to obtain the i-th vertex position information.

Specifically, the encoder, along the coordinate component on the longest edge, obtains the i-th neighborhood range of the i-th segmentation position information, where the i-th neighborhood range can be obtained by setting a threshold and moving close to or away from the origin along the longest edge by the threshold.

Exemplarily, the threshold θ is set, and the neighborhood of the coordinate component on the longest edge is $U(C_p,\theta)$.

Herein, the encoder obtains, in the i-th neighborhood range, from the point cloud information set of all known blocks, the point cloud information of each cube block set in the i-th cube block set, and then can perform surface fitting based on the point cloud information of each cube block set, to obtain the vertex trend information of each cube block set in the i-th neighborhood range. The vertex trend information herein can be the information of the edge where the vertex locates and the vertex information on the edge where the vertex locates. In this way, the encoder can determine, based on the vertex trend information of each cube block set and along the longest edge, the edge to-be-interpolated of each cube block set which is away from the start position of each cube block by the preset cube block length and the vertex to-be-interpolated of each cube block set. The edge to-beinterpolated can be the edge that is consistent with the direction of the information of the edge where the vertex in the vertex trend information locates, and the vertex to-be-interpolated is the point that is consistent with the offset of the edge where the vertex in the vertex trend information locates.

In some implementations of this application, the vertex to-be-interpolated is at least one interpolation point interpolated in the edge to-be-interpolated in one cube block. The edge to-be-interpolated is at least one edge when a coordinate component along the longest edge is the preset cube block length in one cube block, where the at least one edge includes at least one of: four edges of one cube block, any three edges of one cube block, any two parallel edges of one cube block, two neighbouring edges of one cube block, and any edge of one cube block.

Figure 16:
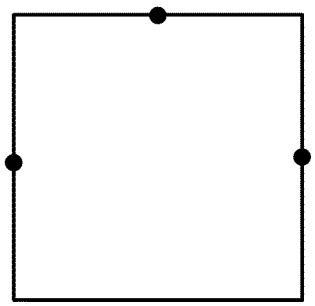
FIG. 16 is exemplary schematic diagram 1 of an interpolation scheme provided in implementations of this application.
Figure 17:
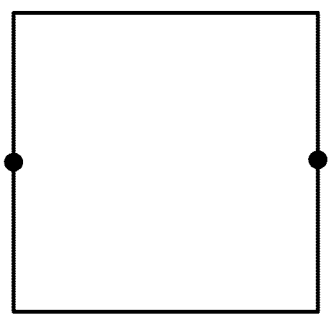
FIG. 17 is exemplary schematic diagram 2 of an interpolation scheme provided in implementations of this application.
Figure 18:
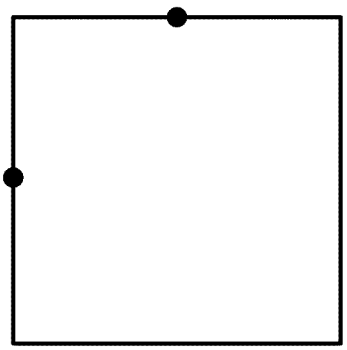
FIG. 18 is exemplary schematic diagram 3 of an interpolation scheme provided in implementations of this application.
Figure 19:
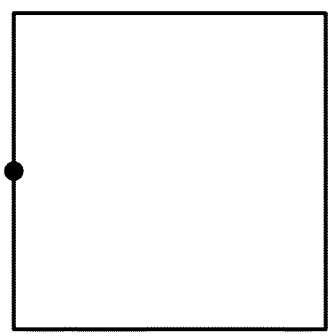
FIG. 19 is exemplary schematic diagram 4 of an interpolation scheme provided in implementations of this application.

Exemplarily, for the block set in the p-th slice, interpolation is performed on the neighborhood plane where the coordinate component along the longest edge is $C_p$-s, to obtain the vertex trend information. Based on the vertex trend information, the interpolation scheme of the p-th edge to-be-interpolated and vertex to-be-interpolated is determined, to obtain the p-th vertex position information. The interpolation scheme can be as follows. As illustrated in FIG. 16, one vertex is interpolated on each of three edges on the neighborhood plane of $C_p$-s. As illustrated in FIG. 17, one vertex is interpolated on each of two parallel edges on the neighborhood plane of $C_p$-s. As illustrated in FIG. 18, one vertex is interpolated on each of two neighbouring edges on the neighborhood plane of $C_p$-s. As illustrated in FIG. 19, one vertex is interpolated on any edge on the neighborhood plane of $C_p$-s.

It should be noted that, S1031-1032 and S1033-1037 are two feasible solutions for achieving S103. The implementation manner adopted when S103 is implemented can be specifically determined according to actual use conditions, which is not limited in the implementations of this application.

Figure 20:
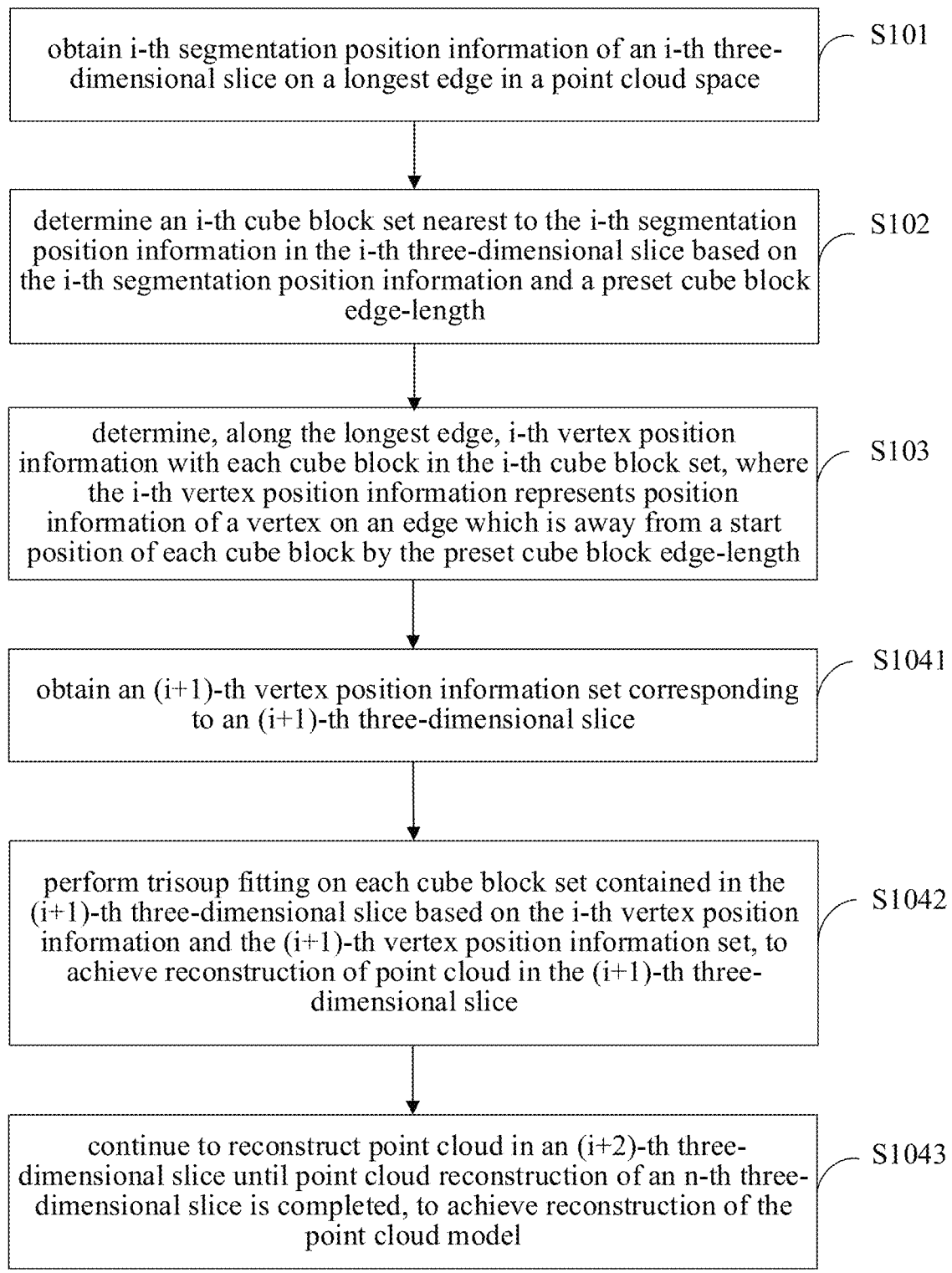
FIG. 20 is flow chart 3 of point cloud model reconstruction provided in implementations of this application.

In some implementations of this application, based on FIG. 10, as illustrated in FIG. 20, the implementation of S104 (reconstructing the point cloud model based on the i-th vertex position information) in the point cloud model reconstruction method provided in the implementations of this application can include S1041-S1043. Refer to the following.

At S1041, an (i+1)-th vertex position information set (also known as an (i+1)-th vertex position set) corresponding to an (i+1)-th three-dimensional slice is obtained.

At S1042, trisoup fitting is performed on each cube block set contained in the (i+1)-th three-dimensional slice based on the i-th vertex position information and the (i+1)-th vertex position information set, to achieve reconstruction of point cloud in the (i+1)-th three-dimensional slice.

At S1043, continue to reconstruct point cloud in an (i+2)-th three-dimensional slice until point cloud reconstruction of an n-th three-dimensional slice is completed, to achieve reconstruction of the point cloud model.

In the implementation of this application, during reconstruction of the (i+1)-th three-dimensional slice, the i-th vertex position information is used to participate in the fitting of trisoup. Therefore, the i-th vertex position information that may be truncated in neighbouring slices is considered in reconstructing geometry. The implementation process of the solution that eliminates the interstice after the point cloud model reconstruction is as follows. The encoder obtains the (i+1)-th vertex position information set corresponding to the (i+1)-th three-dimensional slice, performs trisoup fitting on each cube block set contained in the (i+1)-th three-dimensional slice based on the i-th vertex position information and the (i+1)-th vertex position information set, to achieve reconstruction of the point cloud in the (i+1)-th three-dimensional slice, and continues to reconstruct the point cloud in the (i+2)-th three-dimensional slice until point cloud reconstruction of the n-th three-dimensional slice is completed, to achieve reconstruction of the point cloud model.

It should be noted that, in the implementations of this application, the process of obtaining by the encoder the (i+1)-th vertex position information set corresponding to the (i+1)-th three-dimensional slice is the same as the principle of obtaining the i-th vertex position information set, except that i is replaced with i+1. That is, the encoder obtains the (i+1)-th segmentation position information of the (i+1)-th three-dimensional slice at the longest edge of the point cloud space. Based on the (i+1)-th segmentation position information and the preset cube block length, the encoder determines the (i+1)-th cube block set nearest to the (i+1)-th segmentation position information in the (i+1)-th three-dimensional slice. The encoder determines: in the (i+1)-th cube block set, the corresponding (i+1)-th vertex position information when the coordinate component along the longest edge is away from the start position of each cube block by the preset cube block length.

Figure 21:
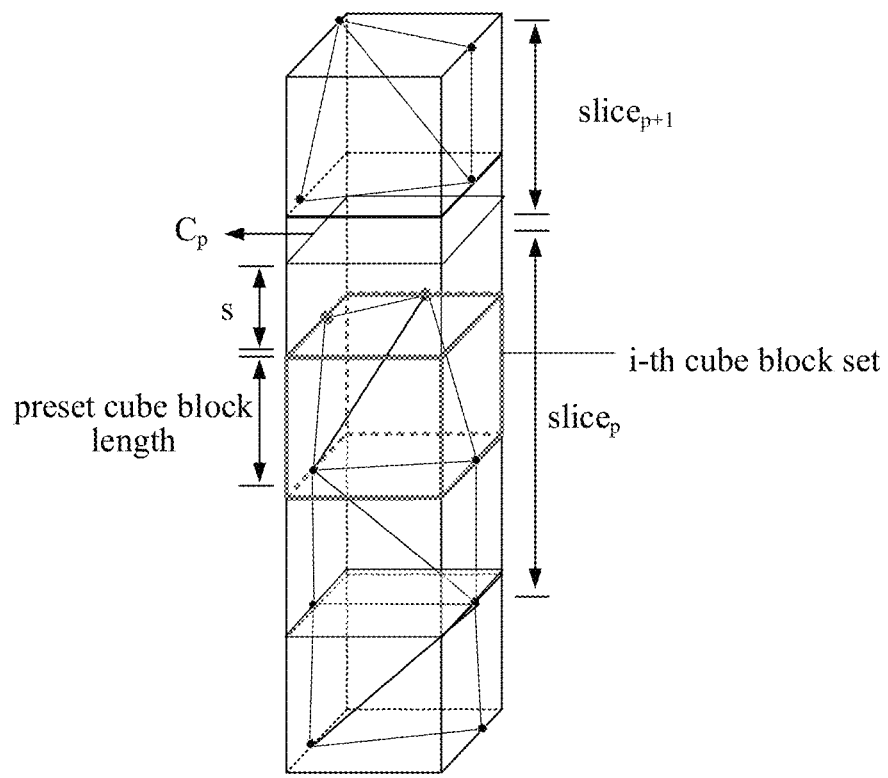
FIG. 21 is exemplary schematic diagram 3 of neighbouring slices provided in implementations of this application.

Exemplarily, as illustrated in FIG. 21, for the first slice-Num−1 slices, first, according to the segmentation position $C_p$=p*minEdge of the p-th slice ($slice_p$) on the longest edge of the point cloud space and the edge length of the block blockSize=$2^{trisoup\_node\_size\_log\ 2}$, determine the block set of the p-th slice at intersection of neighbouring slices. The block set is composed of all blocks in the p-th slice whose start position of the coordinate component on the longest edge is pos[maxEdge]=$C_p$−s−blockSize (i-th cube block set). Store the vertex information at the end position of the coordinate component on the longest edge in these blocks in the table. When encoding the geometry information in the (p+1)-th slice ($slice_{p+1}$), insert the vertex information stored in the p-th slice into the vertex information of the (p+1)-th slice, for use in the trisoup fitting, to achieve reconstructing geometry.

It can be understood that, during reconstruction of the (i+1)-th three-dimensional slice, the encoder uses the i-th vertex position information to participate in the fitting of trisoup. Therefore, the i-th vertex position information that may be truncated in neighbouring slices is considered in reconstructing geometry and the interstice after the point cloud model reconstruction is eliminated. Furthermore, the accuracy of point cloud model reconstruction during encoding and decoding can be improved, and the quality of encoding and decoding can finally be improved.

In some implementations of this application, after S103 in the point cloud model reconstruction method provided in the implementations of this application, the following may be further included. Refer to the following.

An i-th sub-cube block set where the i-th segmentation position information is located is determined based on the i-th segmentation position information and the preset cube block length.

In the implementations of this application, after determining the i-th vertex position information, the encoder also can determine the i-th sub-cube block set where the i-th segmentation position information currently locates based on the i-th segmentation position information and the preset cube block length.

In some implementations of this application, the encoder obtains the i-th offset by rounding the i-th segmentation position information with the preset cube block length as unit. Based on the i-th segmentation position information and the i-th offset, the start position of the sub-cube block where the i-th segmentation position information is located is determined. Based on the start position of the sub-cube block and the preset cube block length, the i-th sub-cube block set is determined.

The i-th offset represents the length from the i-th segmentation position information to the start position of the cube block where it is located. Certainly, the i-th offset also can be obtained in other ways, such as taking the remainder, etc., which is not limited in the implementations of this application.

In this way, by subtracting the i-th offset from the i-th segmentation position information, the start position of the sub-cube block where the i-th segmentation position information is located can be determined.

That is, the encoder rounds the i-th segmentation position information with the blocksize as unit, to obtain the offset, and then subtracts the offset from the i-th segmentation position information, to obtain the start position of the block where it is located, thereby determining the i-th sub-cube block set with the edge length of blocksize.

Figure 22:
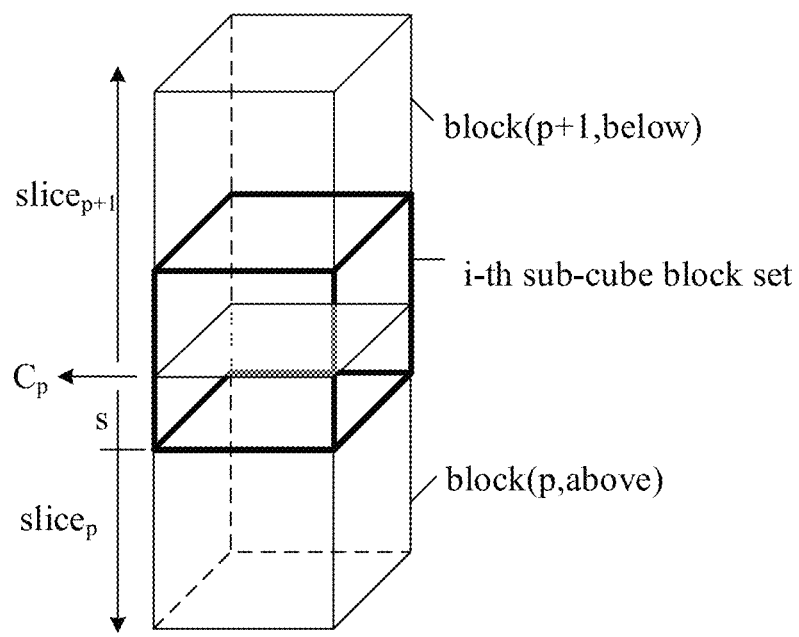
FIG. 22 is exemplary schematic diagram 4 of neighbouring slices provided in implementations of this application.

Exemplarily, as illustrated in FIG. 22, it is assumed that sliceNum slices in total are obtained through partitioning, denoted as $slice_1$, $slice_2$, ..., $slice_{sliceNum}$. For $slice_p$, first, according to the segmentation position $C_p=p*minEdge$ of the p-th slice on the longest edge of the point cloud and the edge length of the block $blockSize=2^{trisoup\_node\_size\_log\,2}$ determine $subslice_p$ (subslice) at the intersection between $slice_p$ and $slice_{p+1}$, where the $subslice_p$, used as additional information, is encoded separately after all slices are encoded. The $subslice_p$ is composed of all blocks (i-th sub-cube block set) in $slice_p$ with $pos[maxEdge]=C_p-s$ as the start position of the coordinate component on the longest edge, where $s=C_p\%$ blockSize (i-th offset).

An i-th secondary-cube block set nearest to the i-th segmentation position information in an (i+1)-th three-dimensional slice is determined based on the i-th segmentation position information and the preset cube block length.

In the implementations of this application, viewed from the direction away from the origin along the longest edge, a region from the i-th segmentation position information to the (i+1)-th segmentation position is seen as a region of the (i+1)-th three-dimensional slice. In view of this, based on the i-th segmentation position information and the preset cube block length, the encoder can determine the i-th secondary-cube block set nearest to the i-th segmentation position information in the (i+1)-th three-dimensional slice.

In some implementations of this application, an i-th offset is obtained by rounding the i-th segmentation position information with the preset cube block length as unit. A start position of a secondary-cube block nearest to the i-th segmentation position information in the (i+1)-th three-dimensional slice is determined based on the i-th segmentation position information, the i-th offset, and the preset cube block length. The i-th secondary-cube block set is determined based on the start position of the secondary-cube block and the preset cube block length.

The i-th offset represents the length from the i-th segmentation position information to the start position of the cube block where it is located. Certainly, the i-th offset also can be obtained in other ways, such as taking the remainder, etc., which is not limited in the implementations of this application.

It should be noted that, the i-th segmentation position information minus the i-th offset, and plus one preset cube block length, the start position of the secondary-cube block nearest to the i-th segmentation position information in the (i+1)-th three-dimensional slice is determined.

It should be noted that, from the i-th sub-cube block set where the i-th segmentation position information is located, move up one edge length of the block, the encoder can obtain the corresponding i-th secondary-cube block set in the (i+1)-th three-dimensional slice. That is, the i-th segmentation position information minus the i-th offset, and plus one preset cube block length, the encoder determines the start position of the secondary-cube block nearest to the i-th segmentation position information in the (i+1)-th three-dimensional slice, and determines the i-th secondary-cube block set based on the start position of the secondary-cube block and the preset cube block length.

i-th below vertex position information (also known as an i-th below vertex position) on an edge which is away from a start position of each cube block (such as a cube block) in the i-th secondary-cube block set by zero is determined along the longest edge.

In the implementations of this application, the encoder determines from the i-th secondary-cube block set the i-th below vertex position information on the edge which is away from the start position of each cube block by zero along the longest edge.

Specifically, the encoder obtains, in the i-th secondary-cube block set, the position information of the vertex on the edge of the target block in the i-th cube block set at a distance of $C_p-s+blockSize$ from the i-th segmentation position information, that is, the i-th below vertex position information.

The i-th vertex position information and the i-th below vertex position information are assigned as i-th sub-vertex position information (also known as an i-th sub-vertex position) corresponding to the i-th sub-cube block set.

Point cloud reconstruction is performed on the i-th sub-cube block set based on the i-th sub-vertex position information.

Continue to reconstruct point cloud in an (i+1)-th sub-cube block set until point cloud reconstruction of a last sub-cube block set is completed.

In the implementations of this application, after the encoder obtains the i-th vertex position information and the i-th below vertex position information, the encoder takes the i-th vertex position information and the i-th below vertex position information as the i-th sub-vertex position information corresponding to the i-th sub-cube block set. Thereafter, the encoder uses the i-th sub-vertex position information to perform point cloud reconstruction on the i-th sub-cube block set, which is executed iteratively. That is, the encoder continues to reconstruct the point cloud in the (i+1)-th sub-cube block set until point cloud reconstruction of the last sub-cube block set is completed. The reconstruction process of the point cloud in the (i+1)-th sub-cube block set is consistent with the implementation principle of point cloud reconstruction of the i-th sub-cube block set, which will not be repeated herein.

That is, in the implementation of this application, the encoder obtains the block set at the junction of the i-th three-dimensional slice and the (i+1)-th three-dimensional slice as the three-dimensional subslice. For this three-dimensional subslice, the encoder performs trisoup fitting and point cloud reconstruction, so that reconstruction of the point cloud information at the junction of every two slices is supplemented. In this way, the reconstructed point cloud information is obtained by combining the trisoup fitting and reconstruction process of each three-dimensional slice, and the point cloud model reconstruction can be completed.

In some implementations of this application, after S104, i.e., after reconstructing the point cloud model based on the i-th vertex position information, the encoder saves the i-th vertex position information and signals the i-th vertex position information and obtained point cloud information of the i-th three-dimensional slice into a bitstream until i=n, and obtains a bitstream containing vertex position information corresponding to each of n slices and point cloud information corresponding to the n slices. In this way, after the encoder transmit the bitstream containing the vertex position information corresponding to each of the n slices and the point cloud information corresponding to the n slices to a decoding end, a decoder can decode the bitstream to obtain a point cloud model with good quality.

It should be noted that, the above is the point cloud reconstruction process of the three-dimensional subslice. In the implementations of this application, the block(s) at the junction of neighbouring slices forms one three-dimensional subslice, so, for one point cloud space, there can be multiple three-dimensional subslices. Moreover, in the implementations of this application, the three-dimensional subslices are used as additional information, which can be separately encoded after all the n slices are encoded.

Figure 23:
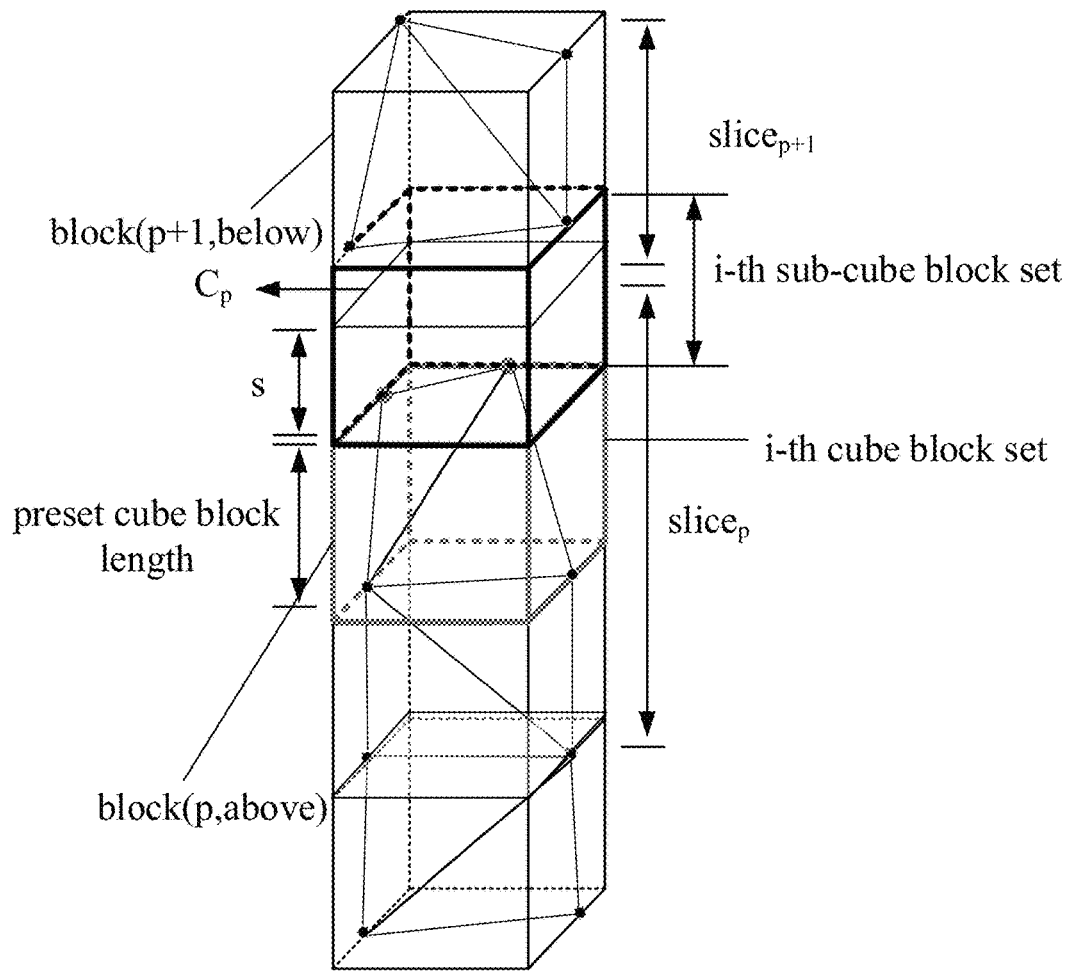
FIG. 23 is exemplary schematic diagram 5 of neighbouring slices provided in implementations of this application.

Exemplarily, as illustrated in FIG. 23, the encoder determines the block set (i-th secondary-cube block set) belonging to $slice_{p+1}$ at the intersection of $slice_p$ (i-th three-dimensional slice) and $slice_{p+1}$ ((i+1)-th three-dimensional slice), denoted as block (p+1, below) ("below" herein means the position at the intersection with $slice_p$ in $slice_{p+1}$). Block (p+1, below) is composed of all blocks in $slice_{p+1}$ each of which has a start position of the coordinate component on the longest edge of pos[maxEdge]=$C_p$−s+blockSize, where s=$C_p$% blockSize. The encoder further stores the vertex information (i-th below vertex position information) on the edge of the plane where the coordinate component on the longest edge in the block set of $slice_{p+1}$ is equal to pos[maxEdge] in table (p, 2). Determine the block set belonging to $slice_p$ at the intersection of $slice_p$ and $slice_{p+1}$, denoted as block (p, above) ("above" herein means the position at the intersection with the next slice in the slice). Block (p, above) (represented by the position of the i-th secondary-cube block set) is composed of all blocks in $slice_p$ whose start position of the coordinate component on the longest edge is equal to pos[maxEdge]=$C_p$−s−blockSize, where s=$C_p$% blockSize. Then, store the vertex information (i-th vertex position information) on the edge where the start position of the coordinate component on the longest edge in block (p, above) is equal to $C_p$−s in table (p, 1), as part of the vertex information in $subslice_p$ (i-th sub-cube block set). Next, determine the block set (i-th secondary-cube block set) belonging to $slice_{p+1}$ at the intersection of $slice_p$ and $slice_{p+1}$, denoted as block (p+1, below) ("below" herein means the position at the intersection with the previous slice in the slice). Block (p+1, below) is composed of all blocks in $slice_{p+1}$ whose start position of the coordinate component on the longest edge is equal to pos[maxEdge]=$C_p$−s+blockSize. Then, store the vertex information (i-th below vertex position information) on the edge where the coordinate component on the longest edge in the block set of $slice_{p+1}$ is equal to pos[maxEdge]=$C_p$−s+blockSize in table (p, 2), as part of the vertex information in $subslice_p$. The sum of the vertex information in table (p, 1) and the vertex information (i-th sub-vertex position information) in table (p, 2) is all vertex information in $subslice_p$.

It can be understood that, during point cloud model reconstruction, the encoder can use the i-th vertex position information to participate in the fitting of trisoup. Therefore, the i-th vertex position information that may be truncated in neighbouring slices is considered in reconstructing geometry and the interstice after the point cloud model reconstruction is eliminated. Furthermore, the accuracy of point cloud model reconstruction during encoding and decoding can be improved, and the quality of encoding and decoding can finally be improved.

Figure 24:
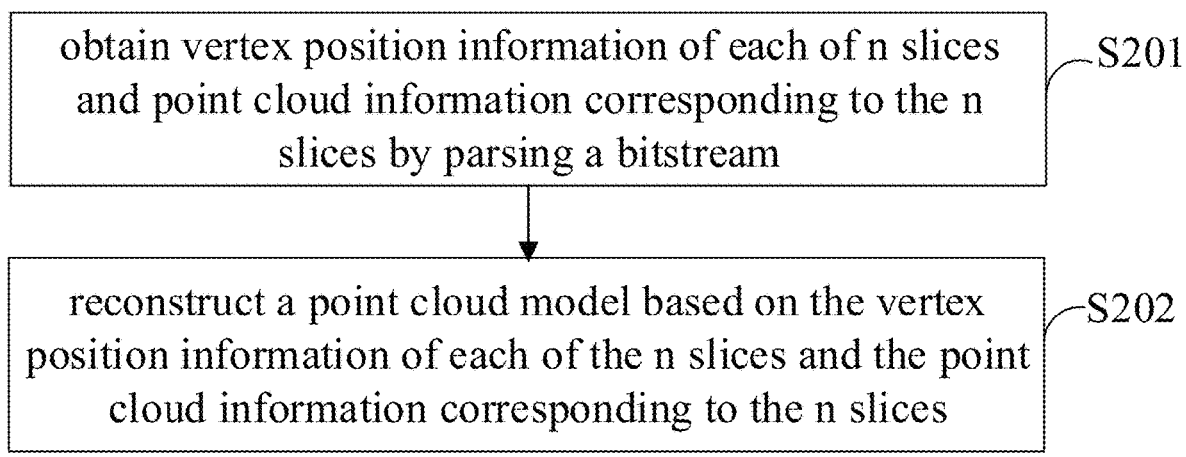
FIG. 24 is a flow chart of a point cloud reconstruction method further provided in implementations of this application.

A point cloud model reconstruction method is provided in the implementations of this application, as illustrated in FIG. 24, the method includes the following.

At S201, vertex position information of each of n slices and point cloud information corresponding to the n slices are obtained by parsing a bitstream.

At S202, a point cloud model is reconstructed based on the vertex position information of each of the n slices and the point cloud information corresponding to the n slices.

In the implementations of this application, when performing geometry reconstruction or reconstructing geometry, a decoder can parse from the bitstream the vertex position information of each of the n slices and the point cloud information corresponding to the n slices. Then, during reconstruction of the point cloud model, the decoder can reconstruct the point cloud model based on the vertex position information of each of the n slices and the point cloud information corresponding to the n slices. During decoding, the vertex position information at the intersection of every two neighbouring slices is used. Thus, during point cloud model reconstruction, the decoder can use the vertex position information at the intersection of every two neighbouring slices to participate in fitting of the trisoup. Thus, the vertex position information that may be truncated in neighbouring slices is considered during reconstructing geometry, and the interstice after the point cloud model reconstruction is eliminated. The accuracy of the point cloud model reconstruction during encoding and decoding can be further improved, and finally the quality of decoding can be improved.

Figure 25:
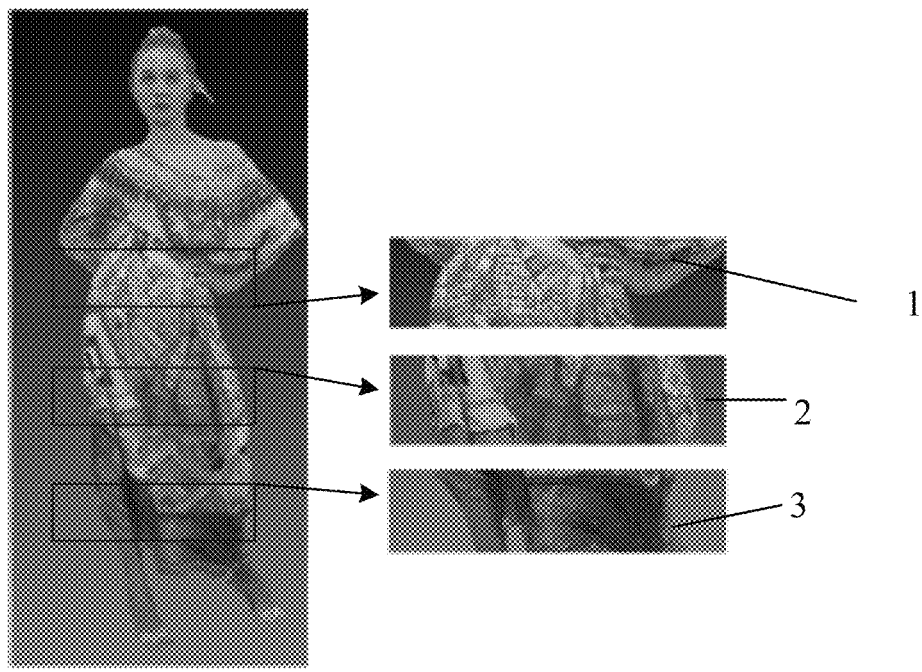
FIG. 25 is exemplary schematic diagram 1 of a point cloud model provided in implementations of this application.

Exemplarily, for the longdress point cloud model, the slice partitioning method along the longest edge of the prior art illustrated in FIG. 4 exhibits poor point cloud reconstruction effect. The three-dimensional image reconstruction effect obtained by using the point cloud segmentation method provided in the implementations of this application is illustrated in FIG. 25. It can be seen from FIG. 4 and FIG. 25 that, interstices appeared after reconstruction in regions 1, 2, and 3 have been eliminated, and the quality of encoding and decoding has been improved.

Figure 26:
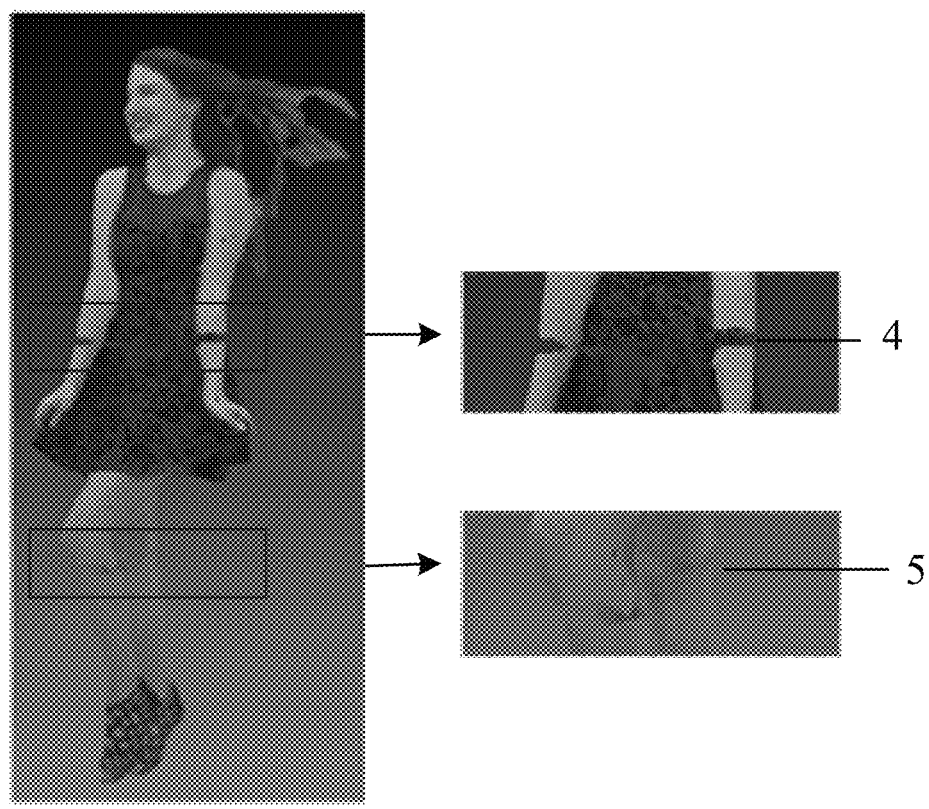
FIG. 26 is exemplary schematic diagram 2 of an existing point cloud model provided in implementations of this application.
Figure 27:
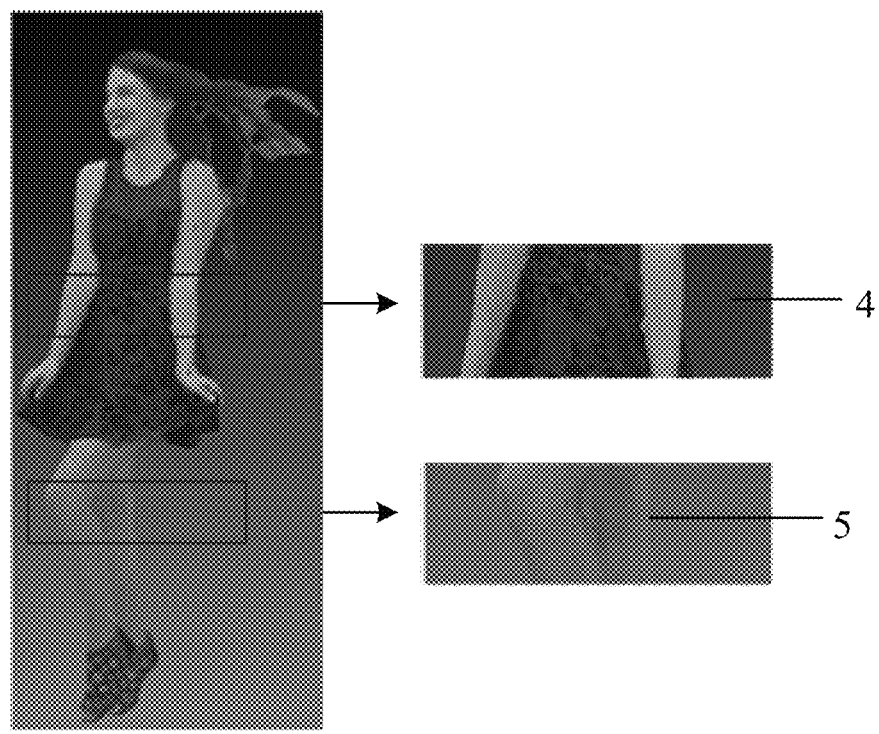
FIG. 27 is exemplary schematic diagram 2 of a point cloud model provided in implementations of this application.

Exemplarily, for the redandblack point cloud model, the slice partitioning method along the longest edge of the prior art illustrated in FIG. 26 exhibits poor point cloud reconstruction effect. The three-dimensional image reconstruction effect obtained by using the point cloud segmentation method provided in the implementations of this application is illustrated in FIG. 27. It can be seen from the comparison of FIG. 26 with FIG. 27 that, interstices appeared after reconstruction in regions 4 and 5 have been eliminated, and the quality of encoding and decoding has been improved.

Figure 28:
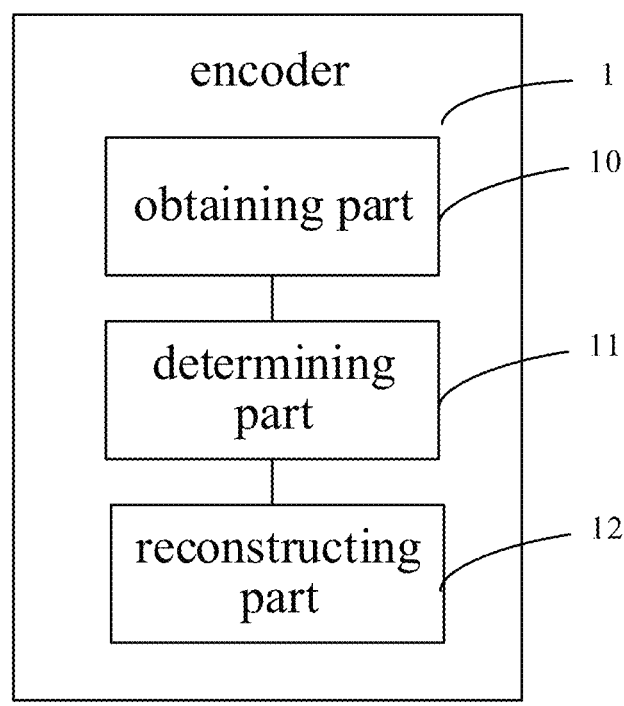
FIG. 28 is structural diagram 1 of an encoder provided in implementations of this application.

Based on the implementation basis of the foregoing implementations, as illustrated in FIG. 28, implementations of this application provide an encoder 1. The encoder 1 includes: an obtaining part 10 configured to obtain i-th segmentation position information of an i-th three-dimensional slice on a longest edge in a point cloud space, where 1≤i≤n−1 and n is a total number of three-dimensional slices to-be-processed; a determining part 11 configured to determine an i-th cube block set nearest to the i-th segmentation position information in the i-th three-dimensional slice based on the i-th segmentation position information and a preset cube block length, and to determine, along the longest edge, i-th vertex position information with each cube block in the i-th cube block set, the i-th vertex position information representing position information of a vertex on an edge which is away from a start position of each cube block by the preset cube block length; and a reconstructing part 12 configured to reconstruct a point cloud model based on the i-th vertex position information.

In some implementations of this application, the obtaining part 10 is further configured to obtain an i-th offset by rounding the i-th segmentation position information with the preset cube block length as unit.

The determining part 11 is further configured to determine a start position of an i-th cube block based on the i-th segmentation position information, the i-th offset, and the preset cube block length, and to determine the i-th cube block set based on the start position of the i-th cube block and the preset cube block length.

In some implementations of this application, the obtaining part 10 is further configured to obtain an i-th vertex position information set corresponding to the i-th three-dimensional slice.

The determining part 11 is further configured to determine, along the longest edge, from the i-th vertex position information set, the i-th vertex position information on the edge which is away from the start position of each cube block in the i-th cube block set by the preset cube block length.

In some implementations of this application, the obtaining part 10 is further configured to obtain, along the longest edge, an i-th neighborhood range of the i-th segmentation position information, to obtain, in the i-th neighborhood range, point cloud information of each cube block set in the i-th cube block set, and to obtain vertex trend information of each cube block set by performing surface fitting based on the point cloud information of each cube block set.

The determining part 11 is further configured to determine, along the longest edge and based on the vertex trend information of each cube block set, an edge to-be-interpolated of each cube block set which is away from the start position of each cube block by the preset cube block length and a vertex to-be-interpolated of each cube block set, and to determine the i-th vertex position information based on the edge to-be-interpolated of each cube block set and the vertex to-be-interpolated of each cube block set.

In some implementations of this application, the edge to-be-interpolated is at least one edge when a coordinate component along the longest edge is the preset cube block length in one cube block, where the at least one edge includes at least one of: four edges of one cube block, any three edges of one cube block, any two parallel edges of one cube block, two neighbouring edges of one cube block, and any edge of one cube block.

The vertex to-be-interpolated is at least one interpolation point interpolated in the edge to-be-interpolated in one cube block.

In some implementations of this application, the obtaining part 10 is further configured to obtain an (i+1)-th vertex position information set corresponding to an (i+1)-th three-dimensional slice.

The reconstructing part 12 is further configured to perform trisoup fitting on each cube block set contained in the (i+1)-th three-dimensional slice based on the i-th vertex position information and the (i+1)-th vertex position information set, to achieve reconstruction of point cloud in the (i+1)-th three-dimensional slice, and to continue to reconstruct point cloud in an (i+2)-th three-dimensional slice until point cloud reconstruction of an n-th three-dimensional slice is completed, to achieve reconstruction of the point cloud model.

In some implementations of this application, the determining part 11 is further configured to determine an i-th sub-cube block set where the i-th segmentation position information is located based on the i-th segmentation position information and the preset cube block length after determining, in the i-th cube block set, corresponding i-th vertex position information when a coordinate component along the longest edge is the preset cube block length, to determine an i-th secondary-cube block set nearest to the i-th segmentation position information in an (i+1)-th three-dimensional slice based on the i-th segmentation position information and the preset cube block length, to determine, along the longest edge, i-th below vertex position information on an edge which is away from a start position of each cube block in the i-th secondary-cube block set by zero, and to assign the i-th vertex position information and the i-th below vertex position information as i-th sub-vertex position information corresponding to the i-th sub-cube block set.

The reconstructing part 12 is further configured to perform point cloud reconstruction on the i-th sub-cube block set based on the i-th sub-vertex position information, and to continue to reconstruct point cloud in an (i+1)-th sub-cube block set until point cloud reconstruction of a last sub-cube block set is completed.

In some implementations of this application, the determining part 11 is further configured to: obtain an i-th offset by rounding the i-th segmentation position information with the preset cube block length as unit, determine a start position of a secondary-cube block nearest to the i-th segmentation position information in the (i+1)-th three-dimensional slice based on the i-th segmentation position information, the i-th offset, and the preset cube block length, and determine the i-th secondary-cube block set based on the start position of the secondary-cube block and the preset cube block length.

In some implementations of this application, the determining part 11 is further configured to: determine a start position of a sub-cube block where the i-th segmentation position information is located based on the i-th segmentation position information and the i-th offset and determine the i-th sub-cube block set based on the start position of the sub-cube block and the preset cube block length.

In some implementations of this application, the encoder further includes an encoding part 15.

The encoding part 15 is configured to: save the i-th vertex position information after reconstructing the point cloud model based on the i-th vertex position information, and signal the i-th vertex position information and obtained point cloud information of the i-th three-dimensional slice into a bitstream until i=n, and obtain a bitstream containing vertex position information corresponding to each of n slices and point cloud information corresponding to the n slices.

Figure 29:
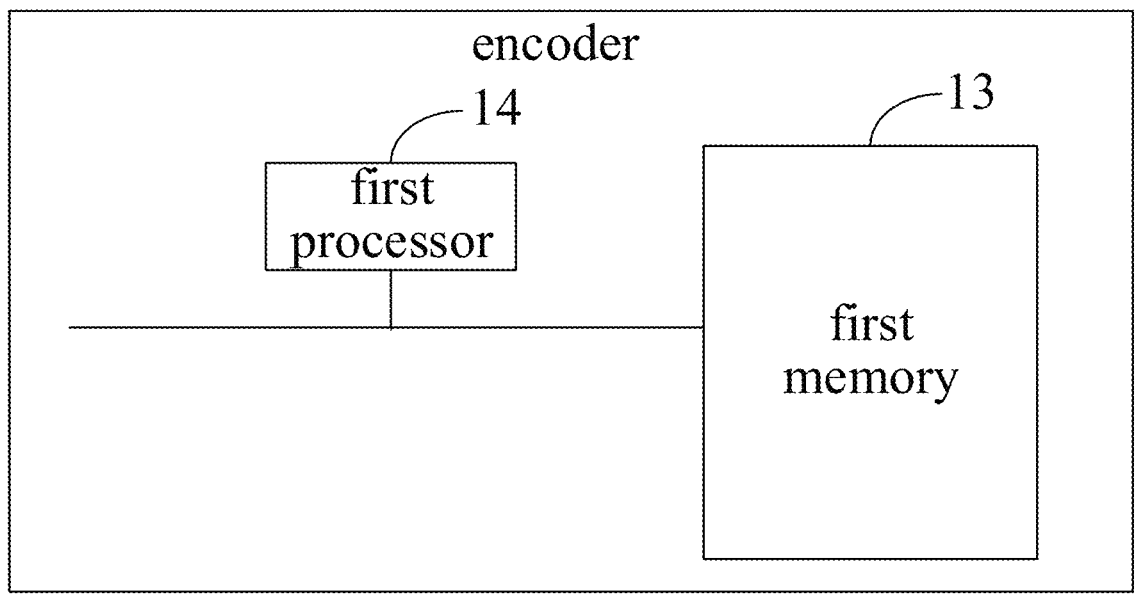
FIG. 29 is structural diagram 2 of an encoder provided in implementations of this application.

In practical application, as illustrated in FIG. 29, implementations of this application further provide an encoder. The encoder includes a first memory 13 and a first processor 14.

The first memory 13 is configured to store executable instructions for point cloud model reconstruction.

The first processor 14 is configured to implement the point cloud model reconstruction method at the encoding side when executing the executable instructions for point cloud model reconstruction stored in the first memory 13.

The processor can be implemented by software, hardware, firmware, or a combination thereof. The processor can use circuits, single or multiple application specific integrated circuits (ASIC), single or multiple general integrated circuits, single or multiple microprocessors, single or multiple programmable logic devices, or a combination of the foregoing circuits or devices, or other suitable circuits or devices. Thereby, the processor can execute corresponding steps of the point cloud model reconstruction method in the aforementioned implementations.

It can be understood that, the encoder also can, during reconstructing geometry, for each three-dimensional slice, that is, during encoding of the currently-encoded three-dimensional slice, construct the trisoup of the currently-encoded three-dimensional slice based on the vertex position information at the intersection with the already-encoded neighbouring three-dimensional slice. As such, during the point cloud model reconstruction, the encoder also can use the vertex position information at the intersection with the already-encoded neighbouring three-dimensional slice to participate in fitting of the trisoup. Thus, the vertex position information that may be truncated in neighbouring slices is considered during reconstructing geometry, and the interstice after the point cloud model reconstruction is eliminated. The accuracy of the point cloud model reconstruction during encoding and decoding can be further improved, and finally the quality of encoding can be improved.

Figure 30:
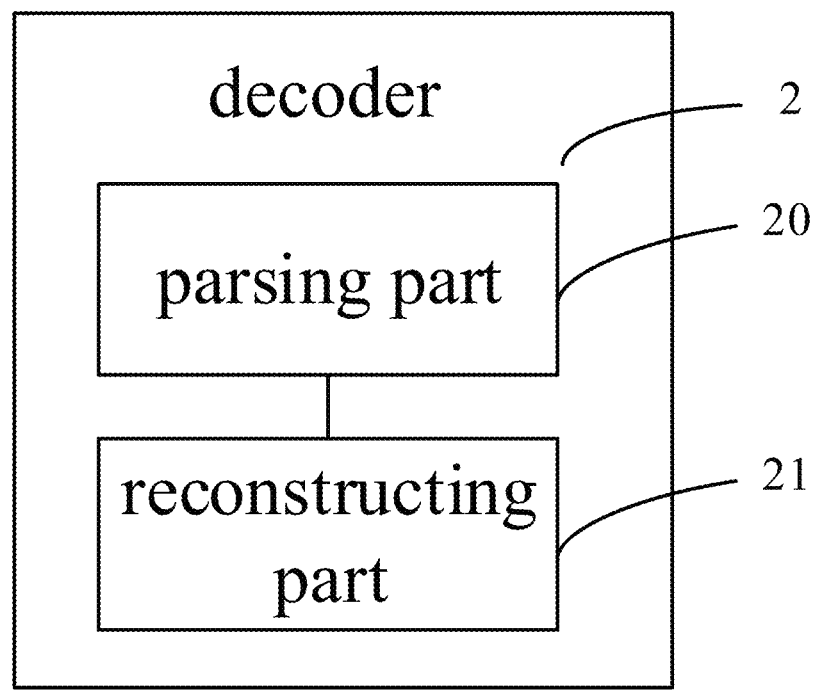
FIG. 30 is structural diagram 1 of a decoder provided in implementations of this application.

Based on the implementation basis of the foregoing implementations, as illustrated in FIG. 30, implementations of this application provide a decoder 2. The decoder 2 includes: a parsing part 20 configured to obtain vertex position information of each of n slices and point cloud information corresponding to the n slices by parsing a bitstream; and a reconstructing part 21 configured to reconstruct a point cloud model based on the vertex position information of each of the n slices and the point cloud information corresponding to the n slices.

Figure 31:
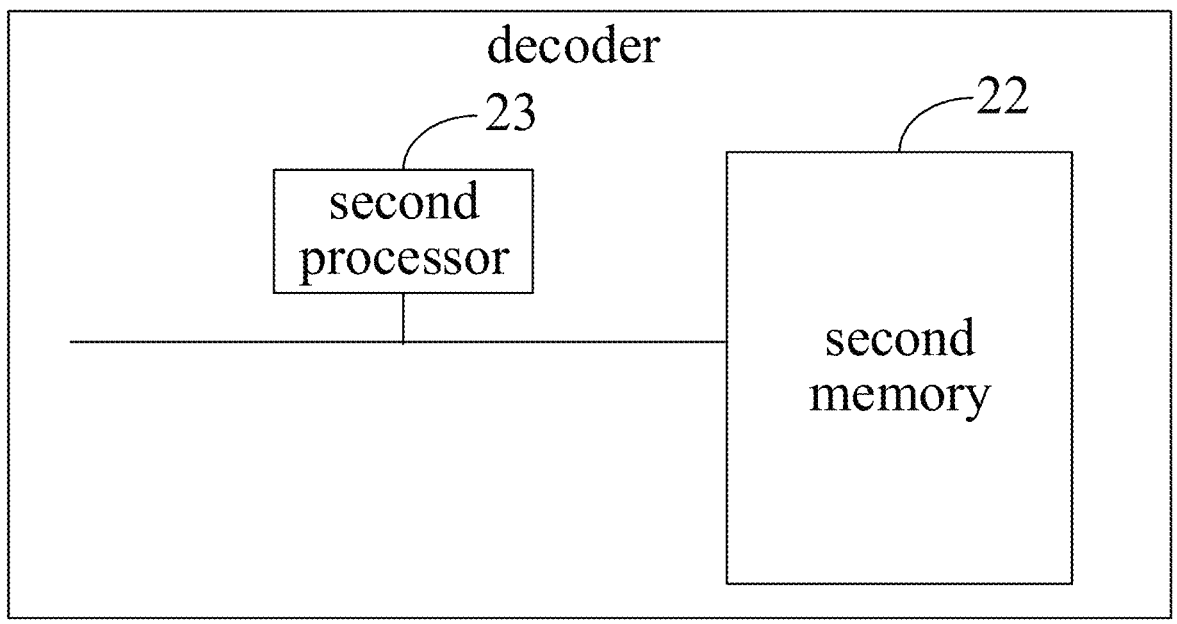
FIG. 31 is structure diagram 2 of a decoder provided in implementations of this application.

In practical application, as illustrated in FIG. 31, implementations of this application further provide a decoder. The decoder includes a second memory 22 and a second processor 23.

The second memory 22 is configured to store executable instructions for point cloud model reconstruction.

The second processor 23 is configured to implement the point cloud model reconstruction method at the decoding side when executing the executable instructions for point cloud model reconstruction stored in the second memory 22.

It can be understood that, when performing geometry reconstruction or reconstructing geometry, the decoder can parse from the bitstream the vertex position information of each of the n slices and the point cloud information corresponding to the n slices. Then, during reconstruction of the point cloud model, the decoder can reconstruct the point cloud model based on the vertex position information of each of the n slices and the point cloud information corresponding to the n slices. During decoding, the vertex position information at the intersection of every two neighbouring slices is used. Thus, during point cloud model reconstruction, the decoder can use the vertex position information at the intersection of every two neighbouring slices to participate in fitting of the trisoup. Thus, the vertex position information that may be truncated in neighbouring slices is considered during reconstructing geometry, and the interstice after the point cloud model reconstruction is eliminated. The accuracy of the point cloud model reconstruction during encoding and decoding can be further improved, and finally the quality of decoding can be improved.

Various functional units described in implementations herein may be integrated into one processing unit or may be present as a number of physically separated units, and two or more units may be integrated into one. The integrated unit may take the form of hardware or a software functional unit.

If the integrated units are implemented as software functional units and sold or used as standalone products, they may be stored in a computer readable storage medium. Based on such an understanding, the essential technical solution, or the portion that contributes to the prior art, or all or part of the technical solution of the application may be embodied as software products. The computer software products can be stored in a storage medium and may include multiple instructions that, when executed, can cause a computing device, e.g., a personal computer, a server, a network device, etc., or a processor to execute some or all operations of the methods described in various implementations. The above storage medium includes various media that can store program codes, such as ferromagnetic random access memory (FRAM), read-only memory (ROM), programmable read-only memory (PROM), erasable programmable read-only memory (EPROM), electrically erasable programmable read-only memory (EEPROM), flash memory, magnetic surface memory, an optical disc, or CD-ROM, compact disc read-only memory, which is not limited in the implementations of this application.

Implementations of this application provide a computer-readable storage medium. The computer-readable storage medium stores executable instructions for point cloud model reconstruction for causing a first processor to implement the method of the first aspect or the second aspect.

Implementations of this application provide a computer-readable storage medium. The computer-readable storage medium stores executable instructions for point cloud model reconstruction for causing a second processor to implement the method of the third aspect.

INDUSTRIAL APPLICABILITY

Implementations of this application provide the point cloud model reconstruction method, the encoder, the decoder, and the storage medium. The method includes the following. The n−1 three-dimensional slices are reconstructed, and based on the vertex position information at the intersection of the currently-encoded three-dimensional slice and the already-encoded neighbouring three-dimensional slice, the trisoup of the currently-encoded three-dimensional slice is constructed, to achieve reconstruction of the point cloud model, where n is the total number during three-dimensional slice partitioning and n is a positive integer greater than or equal to 2. By adopting the above technical implementation scheme, the encoder also can, during reconstructing geometry, for each three-dimensional slice, that is, during encoding of the currently-encoded three-dimensional slice, construct the trisoup of the currently-encoded three-dimensional slice based on the vertex position information at the intersection with the already-encoded neighbouring three-dimensional slice. As such, during the point cloud model reconstruction, the encoder also can use the vertex position information at the intersection with the already-encoded neighbouring three-dimensional slice to participate in fitting of the trisoup. Thus, the vertex position information that may be truncated in neighbouring slices is considered during reconstructing geometry, and the interstice after the point cloud model reconstruction is eliminated. The accuracy of the point cloud model reconstruction during encoding and decoding can be further improved, and finally the quality of encoding can be improved.

What is claimed is:

1. A point cloud model reconstruction method, implemented in an encoder and comprising:
obtaining an i-th segmentation position of an i-th three-dimensional slice on a longest edge in a point cloud space, $1 \le i \le n-1$ and n being a total number of three-dimensional slices to-be-processed;
determining an i-th cube block set nearest to the i-th segmentation position in the i-th three-dimensional slice based on the i-th segmentation position and a preset cube block length;
determining, along the longest edge, an i-th vertex position with a cube block in the i-th cube block set, the i-th vertex position representing a position of a vertex on an edge which is away from a start position of the cube block by the preset cube block length; and
reconstructing a point cloud model based on the i-th vertex position.

2. The method of claim 1, wherein determining the i-th cube block set nearest to the i-th segmentation position in the i-th three-dimensional slice based on the i-th segmentation position and the preset cube block length comprises:
obtaining an i-th offset by rounding the i-th segmentation position with the preset cube block length as unit;
determining a start position of an i-th cube block based on the i-th segmentation position, the i-th offset, and the preset cube block length; and
determining the i-th cube block set based on the start position of the i-th cube block and the preset cube block length.

3. The method of claim 1, wherein determining, along the longest edge, the i-th vertex position with the cube block in the i-th cube block set comprises:
obtaining an i-th vertex position set corresponding to the i-th three-dimensional slice; and
determining, along the longest edge, from the i-th vertex position set, the i-th vertex position on the edge which is away from the start position of the cube block in the i-th cube block set by the preset cube block length.

4. The method of claim 1, wherein determining, along the longest edge, the i-th vertex position with the cube block in the i-th cube block set comprises:
obtaining, along the longest edge, an i-th neighborhood range of the i-th segmentation position;
obtaining, in the i-th neighborhood range, point cloud information of each cube block set in the i-th cube block set;
obtaining vertex trend information of each cube block set by performing surface fitting based on the point cloud information of each cube block set;
determining, along the longest edge and based on the vertex trend information of each cube block set, an edge to-be-interpolated of each cube block set which is away from the start position of the cube block by the preset cube block length and a vertex to-be-interpolated of each cube block set; and
determining the i-th vertex position based on the edge to-be-interpolated of each cube block set and the vertex to-be-interpolated of each cube block set.

5. The method of claim 4, wherein:
the edge to-be-interpolated is at least one edge when a coordinate component along the longest edge is the preset cube block length in one cube block, wherein the at least one edge comprises at least one of: four edges of one cube block, any three edges of one cube block, any two parallel edges of one cube block, two neighbouring edges of one cube block, and any edge of one cube block; and
the vertex to-be-interpolated is at least one interpolation point interpolated in the edge to-be-interpolated in one cube block.

6. The method of claim 1, wherein reconstructing the point cloud model based on the i-th vertex position comprises:
obtaining an (i+1)-th vertex position set corresponding to an (i+1)-th three-dimensional slice;
performing trisoup fitting on each cube block set contained in the (i+1)-th three-dimensional slice based on the i-th vertex position and the (i+1)-th vertex position set, to achieve reconstruction of point cloud in the (i+1)-th three-dimensional slice; and
continuing to reconstruct point cloud in an (i+2)-th three-dimensional slice until point cloud reconstruction of an n-th three-dimensional slice is completed, to achieve reconstruction of the point cloud model.

7. The method of claim 1, further comprising:
after determining, along the longest edge, the i-th vertex position with the cube block in the i-th cube block set,
determining an i-th sub-cube block set where the i-th segmentation position is located based on the i-th segmentation position and the preset cube block length;
determining an i-th secondary-cube block set nearest to the i-th segmentation position in an (i+1)-th three-dimensional slice based on the i-th segmentation position and the preset cube block length;
determining, along the longest edge, an i-th below vertex position on an edge which is away from a start position of a cube block in the i-th secondary-cube block set by zero;
assigning the i-th vertex position and the i-th below vertex position as an i-th sub-vertex position corresponding to the i-th sub-cube block set;
performing point cloud reconstruction on the i-th sub-cube block set based on the i-th sub-vertex position; and
continuing to reconstruct point cloud in an (i+1)-th sub-cube block set until point cloud reconstruction of a last sub-cube block set is completed.

8. The method of claim 7, wherein determining the i-th secondary-cube block set nearest to the i-th segmentation position in the (i+1)-th three-dimensional slice based on the i-th segmentation position and the preset cube block length comprises:
obtaining an i-th offset by rounding the i-th segmentation position with the preset cube block length as unit;
determining a start position of a secondary-cube block nearest to the i-th segmentation position in the (i+1)-th three-dimensional slice based on the i-th segmentation position, the i-th offset, and the preset cube block length; and
determining the i-th secondary-cube block set based on the start position of the secondary-cube block and the preset cube block length.

9. The method of claim 8, wherein determining the i-th sub-cube block set where the i-th segmentation position is located based on the i-th segmentation position and the preset cube block length comprises:

determining a start position of a sub-cube block where the i-th segmentation position is located based on the i-th segmentation position and the i-th offset; and determining the i-th sub-cube block set based on the start position of the sub-cube block and the preset cube block length.

10. The method of claim 1, further comprising:

after reconstructing the point cloud model based on the i-th vertex position, saving the i-th vertex position; and signalling the i-th vertex position and obtained point cloud information of the i-th three-dimensional slice into a bitstream until i=n, and obtaining a bitstream containing a vertex position corresponding to each of n slices and point cloud information corresponding to the n slices.

11. A point cloud model reconstruction method, implemented in a decoder and comprising:

obtaining a vertex position with a cube block of each of n slices and point cloud information corresponding to the n slices by parsing a bitstream, the vertex position representing a position of a vertex on an edge which is away from a start position of the cube block by a preset cube block length; and reconstructing a point cloud model based on the vertex position of each of the n slices and the point cloud information corresponding to the n slices.

12. An encoder, comprising:

a memory configured to store executable instructions for point cloud model reconstruction; and a processor configured to:

obtain an i-th segmentation position of an i-th three-dimensional slice on a longest edge in a point cloud space, $1 \leq i \leq n-1$ and n being a total number of three-dimensional slices to-be-processed;

determine an i-th cube block set nearest to the i-th segmentation position in the i-th three-dimensional slice based on the i-th segmentation position and a preset cube block length, and determine, along the longest edge, an i-th vertex position with a cube block in the i-th cube block set, the i-th vertex position representing a position of a vertex on an edge which is away from a start position of the cube block by the preset cube block length; and reconstruct a point cloud model based on the i-th vertex position.

13. The encoder of claim 12, wherein the processor is further configured to:

obtain an i-th offset by rounding the i-th segmentation position with the preset cube block length as unit; and determine a start position of an i-th cube block based on the i-th segmentation position, the i-th offset, and the preset cube block length, and determine the i-th cube block set based on the start position of the i-th cube block and the preset cube block length.

14. The encoder of claim 12, wherein the processor is further configured to:

obtain an i-th vertex position set corresponding to the i-th three-dimensional slice; and determine, along the longest edge, from the i-th vertex position set, the i-th vertex position on the edge which is away from the start position of the cube block in the i-th cube block set by the preset cube block length.

15. The encoder of claim 12, wherein the processor is further configured to:

obtain, along the longest edge, an i-th neighborhood range of the i-th segmentation position, to obtain, in the i-th neighborhood range, point cloud information of each cube block set in the i-th cube block set, and obtain vertex trend information of each cube block set by performing surface fitting based on the point cloud information of each cube block set; and determine, along the longest edge and based on the vertex trend information of each cube block set, an edge to-be-interpolated of each cube block set which is away from the start position of the cube block by the preset cube block length and a vertex to-be-interpolated of each cube block set, and determine the i-th vertex position based on the edge to-be-interpolated of each cube block set and the vertex to-be-interpolated of each cube block set.

16. The encoder of claim 15, wherein:

the edge to-be-interpolated is at least one edge when a coordinate component along the longest edge is the preset cube block length in one cube block, wherein the at least one edge comprises at least one of: four edges of one cube block, any three edges of one cube block, any two parallel edges of one cube block, two neighbouring edges of one cube block, and any edge of one cube block; and the vertex to-be-interpolated is at least one interpolation point interpolated in the edge to-be-interpolated in one cube block.

17. The encoder of claim 12, wherein the processor is further configured to:

obtain an (i+1)-th vertex position set corresponding to an (i+1)-th three-dimensional slice; and perform trisoup fitting on each cube block set contained in the (i+1)-th three-dimensional slice based on the i-th vertex position and the (i+1)-th vertex position set, to achieve reconstruction of point cloud in the (i+1)-th three-dimensional slice, and continue to reconstruct point cloud in an (i+2)-th three-dimensional slice until point cloud reconstruction of an n-th three-dimensional slice is completed, to achieve reconstruction of the point cloud model.

18. The encoder of claim 12, wherein the processor is further configured to:

determine an i-th sub-cube block set where the i-th segmentation position is located based on the i-th segmentation position and the preset cube block length, to determine an i-th secondary-cube block set nearest to the i-th segmentation position in an (i+1)-th three-dimensional slice based on the i-th segmentation position and the preset cube block length, to determine, along the longest edge, an i-th below vertex position on an edge which is away from a start position of the cube block in the i-th secondary-cube block set by zero, and assign the i-th vertex position and the i-th below vertex position as an i-th sub-vertex position corresponding to the i-th sub-cube block set; and perform point cloud reconstruction on the i-th sub-cube block set based on the i-th sub-vertex position, and continue to reconstruct point cloud in an (i+1)-th sub-cube block set until point cloud reconstruction of a last sub-cube block set is completed.

19. The encoder of claim 18, wherein the processor is further configured to:

obtain an i-th offset by rounding the i-th segmentation position with the preset cube block length as unit, determine a start position of a secondary-cube block nearest to the i-th segmentation position in the (i+1)-th three-dimensional slice based on the i-th segmentation position, the i-th offset, and the preset cube block length, and determine the i-th secondary-cube block set based on the start position of the secondary-cube block and the preset cube block length.

20. A decoder, comprising:
a memory configured to store executable instructions for point cloud model reconstruction; and
a processor configured to obtain a vertex position with a cube block of each of n slices and point cloud information corresponding to the n slices by parsing a bitstream, the vertex position representing a position of a vertex on an edge which is away from a start position of the cube block by a preset cube block length and reconstruct a point cloud model based on the vertex position of each of the n slices and the point cloud information corresponding to the n slices, when executing the executable instructions for point cloud model reconstruction stored in the memory.

* * * * *